United States Patent
Tawri et al.

(10) Patent No.: US 8,401,997 B1
(45) Date of Patent: *Mar. 19, 2013

(54) SYSTEM AND METHOD FOR REPLICATION USING CONSISTENCY INTERVAL MARKERS IN A DISTRIBUTED STORAGE ENVIRONMENT

(75) Inventors: Deepak Tawri, Mountain View, CA (US); Ronald S. Karr, Palo Alto, CA (US); John A. Colgrove, Los Altos, CA (US); Raghu Krishnamurthy, Santa Clara, CA (US); Anand A. Kekre, Pune (IN); Robert Baird, San Jose, CA (US); Oleg Kiselev, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 11/230,976

(22) Filed: Sep. 20, 2005

Related U.S. Application Data

(60) Provisional application No. 60/695,606, filed on Jun. 30, 2005.

(51) Int. Cl.
G06F 7/00 (2006.01)
G06F 17/00 (2006.01)

(52) U.S. Cl. ........................... 707/655; 707/656
(58) Field of Classification Search .................. 707/655, 707/656

See application file for complete search history.

(56) References Cited

U.S. PATENT DOCUMENTS

| | | | |
|---|---|---|---|
| 5,588,147 A | 12/1996 | Neeman et al. | |
| 5,787,247 A | 7/1998 | Norin et al. | |
| 5,794,253 A | 8/1998 | Norin et al. | |
| 5,956,489 A | 9/1999 | San Andrews et al. | |
| 6,173,377 B1 * | 1/2001 | Yanai et al. | 711/162 |
| 6,457,065 B1 | 9/2002 | Rich et al. | |
| 6,751,674 B1 | 6/2004 | Satagopan et al. | |
| 6,880,052 B2 | 4/2005 | Lubbers et al. | |
| 7,293,050 B2 * | 11/2007 | Arakawa et al. | 707/204 |
| 7,392,421 B1 * | 6/2008 | Bloomstein et al. | 714/4 |
| 2002/0166031 A1 * | 11/2002 | Chen et al. | 711/141 |
| 2003/0182319 A1 | 9/2003 | Morrison | |
| 2004/0019614 A1 | 1/2004 | Wang | |
| 2004/0236915 A1 * | 11/2004 | Kawamura et al. | 711/162 |
| 2005/0071391 A1 | 3/2005 | Fuerderer et al. | |
| 2005/0076070 A1 | 4/2005 | Mikami | |
| 2005/0086272 A1 | 4/2005 | Novik et al. | |
| 2005/0091391 A1 | 4/2005 | Burton et al. | |

(Continued)

OTHER PUBLICATIONS

Kemme et al, A Suite of Database Replication Protocols based on Group Communication Primitives, Distributed Computing Systems, May 29, 1998, pp. 156-163.*

*Primary Examiner* — Mariela Reyes
(74) *Attorney, Agent, or Firm* — Robert C. Kowert; Meyertons, Hood, Kivlin, Kowert & Goetzel, P.C.

(57) ABSTRACT

Applications executing on various nodes in a distributed storage environment may write data to primary storage and may also replicate the data to secondary storage via a replication target. An interval coordinator may coordinate the periodic saving of checkpoints or snapshots of the replicated data. The interval coordinator may determine the length of consistency intervals between the saving of each of the checkpoints. Writes to the replication target from each of the nodes may be associated with the current consistency interval and, in some embodiments, with a unique per-node sequence number. When transitioning between consistency intervals, each node may be configured to temporarily suspend completion of the writes and to send the replication target a consistency interval marker indicating that the node has completed all writes for the current consistency interval.

24 Claims, 10 Drawing Sheets

U.S. PATENT DOCUMENTS

| | | |
|---|---|---|
| 2005/0108292 A1 | 5/2005 | Burton et al. |
| 2005/0125609 A1 | 6/2005 | Satoyama et al. |
| 2005/0138306 A1 | 6/2005 | Panchbudhe et al. |
| 2006/0200637 A1* | 9/2006 | Galipeau et al. .............. 711/162 |

* cited by examiner

SYSTEM AND METHOD FOR REPLICATION USING CONSISTENCY INTERVAL MARKERS IN A DISTRIBUTED STORAGE ENVIRONMENT

This application claims benefit of priority to U.S. Provisional Application Ser. No. 60/695,606, which was filed on Jun. 30, 2005.

BACKGROUND OF THE INVENTION

1. Field of the Invention

This invention relates to data replication systems in general and, more particularly, to a method and apparatus for consistency interval replication snapshots in a distributed storage environment.

2. Description of the Related Art

Modern distributed shared storage environments may include multiple storage objects connected via one or more interconnection networks. The interconnection networks provide the infrastructure to connect the various elements of a distributed shared storage environment. Within the storage environment, file system abstractions may be built on top of multiple storage objects. These storage objects may be physical disks or storage aggregations, like logical volumes that distribute data across multiple storage devices. As the number of logical volumes and file system abstractions grows, the complexity of the entire storage environment grows dramatically.

Storage systems frequently use data redundancy mechanisms to ensure data integrity, consistency, and availability. Other uses for data redundancy may include backing up data, distributed load sharing, disaster recovery, or point-in-time analysis and reporting. One approach to data redundancy is to copy or replicate data from a primary storage system to a second or replicated storage system. In other words, a storage system may duplicate data written to the primary copy of a data block to redundant or replicated copies of that data block in other, secondary storage systems. In some designs, this copying is done synchronously when the data I/O is preformed. In other designs, this replication may be performed asynchronously with the second storage system's data state lagging the primary storage state by a time interval that can be anywhere from fractions of a second to many hours, depending on the design objectives and technologies used.

Under some failure conditions, volumes that contain redundant data may require consistency recovery. For example, a host may crash during a write to a volume, or a component in the interconnect infrastructure may fail. This may leave the volume in an inconsistent state. For example, if the volume is mirrored to protect against data loss due to a single disk failure, and stores two or more complete copies of the data, a system crash during a write may leave data copies in different states and with different contents. In such situations, a consistency recovery operation may need to be performed to resynchronize the data contents and state of mirrored storage devices. One well-known synchronization method involves copying the entire contents of one data copy to another, such that all copies of data in a redundant volume have the same data contents. This process can take a very long time in even modestly sized storage configurations. To reduce the impact of consistency recovery, another well-known consistency recovery method involves maintaining a bitmap of in-progress I/Os, sometimes called "scoreboarding" or "dirty region mapping." Every bit in this bitmap represents a region of one or more blocks of the volume. A bit in this map is set, or "dirtied", when an I/O to the volume is issued and cleared after the I/O has completed.

SUMMARY

One goal of data replication may be to achieve a consistent copy of data being generated by independent streams of writes from nodes in a clustered or distributed environment. Such snapshots or cuts of data can be used to facilitate various data copy and frozen image services in distributed environments. Consistent or global snapshots (or checkpoints, cuts, etc.) of data across nodes in distributed systems may be achieved through the use of consistency interval markers. Applications, file systems, volume managers, and/or other processes executing on nodes in the distributed or clustered storage environment may write data to primary storage volumes and the nodes may also replicate that data to a replication target in the storage system. In consistency interval marker based replication, as described herein, nodes may be allowed to send writes to the replication target freely, but the nodes may be configured to suspend writes from time to time in such a way as to achieve a point at which the data on the replication target is consistent. The replication target may generate a snapshot or checkpoint of the data and may then continue to receive writes again until the next consistency point. In order to obtain points in time where the replicated data is consistent, consistency interval markers may be used. Consistency interval markers may ensure that all data writes from source nodes are completed before a consistency interval snapshot or checkpoint is generated, and thus may ensure that the data in the checkpoint is consistent. Consistency interval marker based replication may involve an interval coordinator managing the starting and stopping of individual consistency intervals and thus the timing of consistency checkpoints or snapshots. This may be particularly useful for a distributed application where cross-system consistency for a checkpoint may be needed to ensure that the checkpoint is useful.

As noted above, each source node in a distributed or clustered environment may write its data both to a primary storage volumes and also to a replication storage target. The writes to the replication target may be tagged or otherwise associated with the current consistency interval ID and, in some embodiments, with a per-node unique sequence number. The interval coordinator may determine when a consistency interval should end and may send a message to all participating nodes that indicates the end of an interval. In response, each node may send an acknowledgment to the interval coordinator. Once all the nodes have acknowledged, the interval coordinator may send a message indicating a successful interval transition. After sending acknowledgements to the interval coordinator each node may suspend completion of writes until receiving the interval transition message from the coordinator. Once the interval transition as been completed, the nodes may resume sending writes to the replication target. Additionally, according to some embodiments, each node may insert into the IO stream, or otherwise send to the replication target, a specific consistency interval marker between the last write of one interval and the first write of the next interval. In other words, each node may send a message to the replication target signaling the node's transition from one interval to the next. Thus, the replication target may wait until receiving a consistency interval marker from every node before generating a snapshot or checkpoint of the data.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Consistency Interval Marker Based Replication

Figure 1:
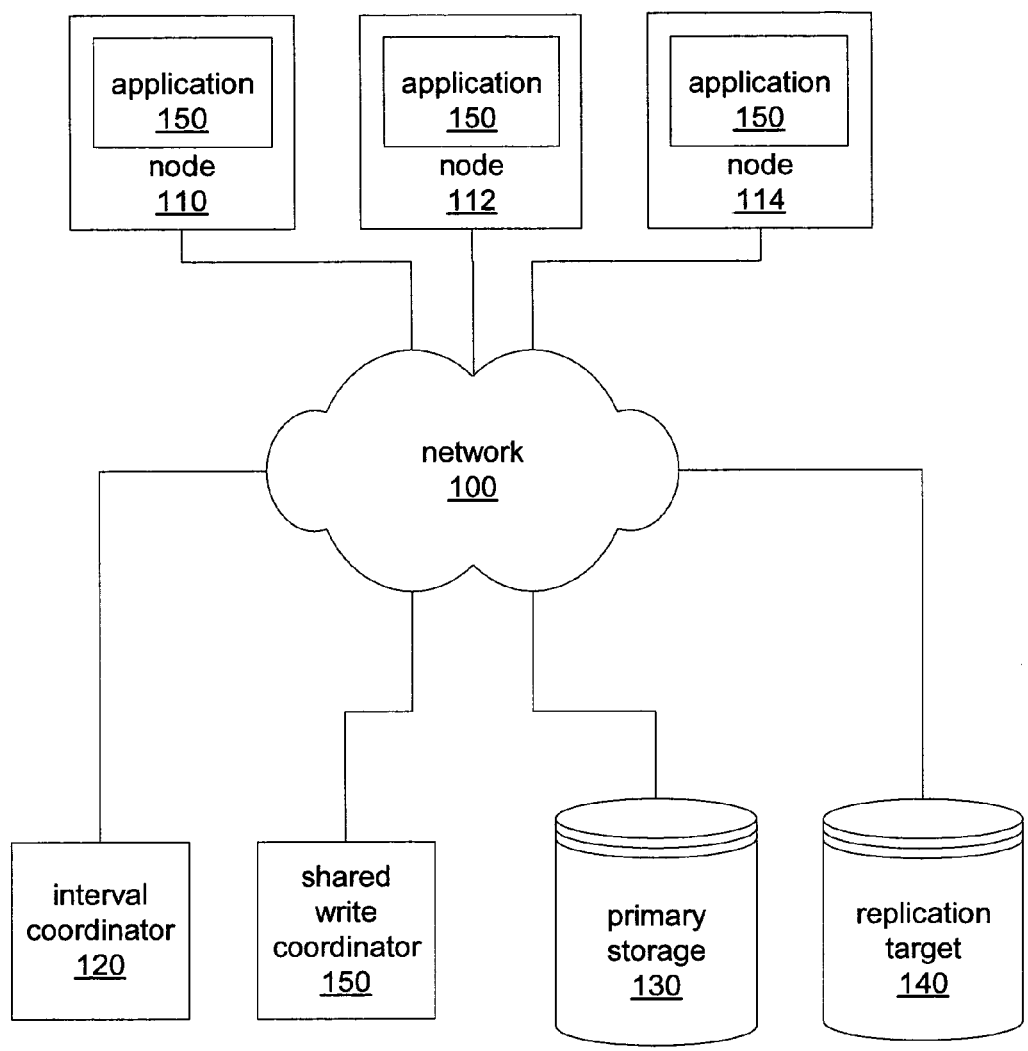
FIG. 1 is a block diagram illustrating a network environment in which consistency interval marker based replication may be implemented, in one embodiment.

Consistency interval marker based replication, as described herein, may be implemented on distributed or clustered computing environments, such as the one illustrated in FIG. 1. As shown in FIG. 1, a set of source nodes, such as nodes 110, 112 and 114 may write data to one or more primary storage devices, such as primary storage 130 and may also replicate the data writes to a replication target, such as replication target 140. The system illustrated in FIG. 1 may implement consistency interval marker based replication, as described herein. Consistency interval marker based replication may, in some embodiments, involve a two-phase distributed algorithm to obtain consistent snapshots, which also may be referred to as consistency points, or global snapshots, of data across the nodes in the distributed environment. Such consistent snapshots of data may facilitate various data copy and replication image services in the distributed environment. For example, consistency interval replication may provide periodic consistency checkpoints for crash recovery. A consistency interval may be defined as the time between two consecutive consistency points. In general, a consistency interval may begin just after one consistency point and end just before the next. Similarly, a consistency point includes data written during the previous consistency interval.

While consistency interval marker based replication is described herein mainly in reference to write requests from applications, file systems, volume managers and similar processes to storage devices, in general, consistency interval marker based replication may be utilized to provide consistent points or snapshots for any type of data stream. For example, consistency interval replication may provide consistency checkpoints or snapshots across collections of logs, across collections of storage objects, or across sets of message streams in the distributed or clustered environment. Please note that the terms "I/O" and "write" are both used interchangeably herein to refer to data written by a source node to the replication target during consistency interval marker based replication. Please further note that the term "application" is used to refer to any processes executing on source nodes and replicating data to a replication target. Thus, "application", as used herein may refer to a volume manager, file system, database application, storage replicator, or an end-user application, as well as any other processes replicating data.

When implementing consistency interval marker based replication, data written to primary storage 130 may also be replicated to replication target 140. Each actual data write from a node, such as from node 110, may include an identifier of the current consistency interval. An interval coordinator, such as interval coordinator 120 may determine and distribute IDs for each consistency interval and may also determine the length of each interval and manage the transitions between intervals. Consistency intervals may be of various lengths and the length of each interval may be determined in any of numerous methods, according to various embodiments. For example, in one embodiment, all consistency intervals may be same length of time, say 5 seconds. In other embodiments however, consistency interval length may be based upon the amount of data replicated or the number of write requests during that consistency interval. In yet other embodiments, consistency intervals may be determined by an application which is generating data changes (e.g. a database application) and sets interval markers according to this application's view of data consistency (e.g. on transaction commits, or other consistency events recognized by such applications as appropriate recovery and restart points). Replication may be generally asynchronous in that the storage subsystem may complete the I/O to the application before it is replicated. This differs from the writes to base or primary storage, which generally don't complete to the application that submitted the I/O until it is completed on the base storage.

As noted above, interval coordinator 120 may manage the transitions between consistency intervals. For example, interval coordinator 120 may determine when the current interval should end and the next begin. Interval coordinator 120 may ensure that the data replicated during an interval is consistent, i.e. that that no write replicated during that interval depends upon a write that has not yet been replicated by the end of that interval. At the start of each consistency interval the interval coordinator may send a message to all source nodes in the distributed environment informing them of the new interval and possibly including an interval identifier to be included in writes from each node to the replication target. When sending a message, the consistency interval coordinator may utilize any suitable method of communication. In general, the term "message", as used herein refers to the communication of information via any suitable method and/or transport. At the end of each interval the interval coordinator may also send a message to all nodes informing them that the interval is over. In some embodiments, a single interval transition message may be used to signal the transition between two consistency intervals. The individual nodes may, in some embodiments, be configured to suspend the completion of writes during the transition period between intervals. Suspending write completions may allow all in-progress writes from source nodes to complete and thus may allow the data to be consistent when the replication target checkpoints or saves a snapshot for the consistency interval. Thus, when transitioning between intervals, the interval coordinator may signal each node that the current interval has ended and, in response, each node may begin including the new interval's ID with each write to replication target 140.

After sending an interval end message to each node, the interval coordinator may wait for an acknowledgment from each node before proceeding. This may allow for discovery of a crashed node. For example, if a node fails to respond or acknowledge a message from the interval coordinator, the interval coordinator may determine that the node has failed (or crashed) and may initiate recovery procedures for that node, as described below. After interval coordinator 120 has received an acknowledgment from every node, it may then send an interval start message informing nodes to complete held writes and to begin using the new interval's identifier in writes to replication target 140.

When switching between intervals, each node may also be configured to send a consistency interval marker message to the replication target. For example, each node may send a message indicating that it has finished sending all writes for the current consistency interval. In other embodiments, each node may add a consistency interval marker or other indication of the interval transition into the first write message of a new interval. In yet other embodiments, each node may be configured to include sequence numbers with every write during an interval and such sequence numbers may roll over or reset at interval transitions. Thus, in some embodiments, the combination of a new interval ID and a sequence number rollover may indicate to the replication target a consistency interval marker for a particular node. When including sequence numbers with writes, each node may maintain its own sequencing and thus the sequence number may be considered node-specific. In yet other embodiments, the nodes may only be configured to include the new interval's ID with writes to the replication target and the replication target may consider the first write from a node that includes the new interval's identifier to be a consistency interval marker in the I/O stream.

Alternatively, in other embodiments, each node may send a consistency interval marker message to the interval coordinator rather than to the replication target. The interval coordinator may then send a single consistency interval marker message to the replication target after receiving individual consistency interval marker messages from the source nodes. Thus, in some embodiments, the replication target does not have to keep track of which nodes have sent consistency interval markers, but instead may rely upon the interval coordinator to send a single consistency interval marker message informing the replication target that all activity for the current interval is complete and that a checkpoint or snapshot for this interval may be saved/written.

In some embodiments, the replication target may save or store the writes received from nodes during a consistency interval in a log or other data structure separate from the main storage volume(s) for the replicated data. In some embodiments, writes from nodes may be stored in a persistent log for recovery purposes. Once the consistency interval is over and the nodes have indicated that all their data has been sent, the replication target may read the saved writes to create a snapshot or checkpoint of the data on replication storage volumes, sometimes called secondary storage. When checkpointing data for a consistency interval, the replication target may store only the changes to data made during the consistency interval, rather than make a complete copy or snapshot all the data. Thus, in some embodiments, a single consistency checkpoint may only include changes to the data made since a previous consistency checkpoint.

In other embodiments, however, a replication target may not log or spool the writes as they are received, but instead may store the data from writes to the replicated storage volumes immediately upon receipt from a node. Writing data immediately to replicated storage volumes may save time when processing the end of a consistency interval. However, it may be necessary to save complete snapshots of the data at each consistency point, rather than merely storing the data changes between two consistency points.

After receiving consistency point messages from every source node in the distributed or clustered environment, replication target 140 may notify interval coordinator 120 of that fact, according to some embodiments. In response, interval coordinator 120 may send an interval start message to the source nodes indicating the start of the new interval.

In some embodiments, each node may register with the interval coordinator or the replication target before sending writes. For example, node 110 may register with interval coordinator 120 and in response interval coordinator 120 may send node 110 the current interval identifier. In some embodiments, new nodes may join the replication process at any time, while, in other embodiments, new nodes may only be able to join at the start of a new consistency interval.

Block Conflict Resolution

Consistency interval marker based replication, as described herein, may be implemented for systems in which the data written by nodes 110, 112 and 114 is read-shared, but not write-shared, according to some embodiments. That is, no two nodes may be able to write to the same storage block of data at the same time. When implementing consistency interval marker based replication in a write-shared environment, however, block conflict resolution may be utilized to ensure consistent data at consistency interval transitions. For example, when two nodes write to the same block of data during the same consistency interval, the system may use block conflict resolution to ensure the consistency of the data for that block within the consistency interval. When implementing block conflict resolution, interval coordinator 120 may track data blocks being written to by the nodes. Interval coordinator 120 may identify a block conflict when two nodes write to the same data block during the same consistency interval. When resolving such block conflicts, the interval coordinator may send a list of blocks with conflicts to each node. For example, if node 110 and node 112 each write to a particular data block, the interval coordinator may send an indication or identifier of the data block, such as the logical or physical storage address of the data block, to all nodes during the interval transition. Alternatively, in other embodiments, interval coordinator 120 may send an indication or identifier of the write requests, such as node specific sequence numbers, to the nodes that caused a block conflict. In response, the source nodes may be configured to suspend all writes to the conflict blocks until the conflicts can be resolved. Additionally, the interval coordinator may be configured to resolve conflicts by determining or "proving" the ordering of the writes to the conflict blocks. For example, in one embodiment, the particular writes from one node may be determined to be earlier than conflicting writes from another node, thus "proving" that the writes do not actual conflict so long as the ordering between those writes is maintained and communicated properly to the replication target.

In order to determine a list of conflict blocks, interval coordinator 120 may query every node to obtain a list of blocks written to by that node. Alternatively, each node may periodically send such a list of modified blocks to the interval coordinator during each interval. For example, each node may send a list of modified blocks at regular intervals, such as according to some fraction of the overall interval time length. For instance, in one embodiment, a node may be configured to send a list of modified blocks 5 times during an interval. In other embodiments, a node may be configured to send a list of modified blocks during idle time between write requests. Alternatively, in yet other embodiments, a node may be configured to send a list of modified blocks after a certain number of writes or after a predetermined number of blocks have been modified. Interval coordinator 120 may be configured to compare the blocks modified by each node to determine a list of conflict nodes that were written to be more than one node during the current interval, according to some embodiments. When informing the nodes of any block conflicts, interval coordinator 120 may include a list of conflict blocks in the interval end message, or in a specific block conflict message. Additionally, in some embodiments, interval coordinator 120 may be configured to initially send a preliminary list of block conflicts and subsequently send a final or updated list of block conflicts.

As noted above, source nodes, such as nodes 110, 112, and 114, may send lists of modified blocks to the interval coordinator from time to time during a consistency interval. Rather than sending a message after every write, nodes may collect a list of modified blocks and send a single message including a list or batch of modified blocks. Nodes may include ranges of modified blocks rather than individually list contiguous blocks. As described above, the period used for sending list of modified block may be some fraction of the interval period itself. Alternatively, each node may send its list of modified blocks whenever that list exceeds some predetermined number of modified blocks. In general, each node may only include a modified block on a single list to the interval coordinator. Thus, even if a block is modified multiple times during the same consistency interval, it may only be included in only one list message to the interval coordinator, according to certain embodiments. Each time interval coordinator 120 receives a list of modified blocks from a node, interval coordinator 120 may merge the latest list with earlier lists. In general, interval coordinator 120 may be configured to maintain a single list of modified blocks for each node and to merge newly received lists of modified blocks into this single list, according to one embodiment. Additionally, interval coordinator 120 may maintain multiple such lists, one for each node. A node may also send a list identifying each individual modified block or, alternatively, may send ranges of modified blocks to save time, effort, and bandwidth. In general, any suitable method for identifying multiple data blocks may be used to send a modified block list from a node to the interval coordinator, according to various embodiments.

In general, interval coordinator 120 may send the list of block conflicts to all nodes in the distributed or clustered environment. In some embodiments, the interval coordinator may send such a list of block conflicts after sending an interval end message, but prior to sending the interval start message. In response to receiving a list of conflict blocks, each node may be configured to suspend any new writes for data blocks on the conflict list until the conflicts have been resolved and a new interval has begun. Additionally, in response to receiving a list of conflict blocks, each node may respond with an updated list of blocks modified after receiving the initial interval end message. For example, some writes may be in process when a node receives an interval end message from interval coordinator 120 and thus the blocks modified by those writes may not have been included in any list of modified blocks previously sent to the interval coordinator. In some embodiments, interval coordinator 120 may then use the updated or final lists of modified blocks from each node to determine a final list of conflict blocks and may distribute the final list of conflict blocks to the every node.

Interval coordinator 120 may resolve conflicts to data blocks in various ways. In general, interval coordinator 120 may consider two different types of write conflicts. Firstly, two or more writes may modify the same block during the same consistency interval. The replication target may receive two writes to the same data block by two different nodes in a different order than the order in which those writes were originally completed on the primary data storage. In other words, there may exist an ordering ambiguity between the two writes. For example, node 110 may write a particular data block and node 112 may subsequently overwrite node 110's write with another write to that same data block. However, it may be possible, due to network congestion or other issues, that when the writes to that data block are sent to replication target 140 they arrive out of order. Thus, while node 112 may have actually written to the data block last, its write may arrive first to replication target 140. Without recognizing and resolving such block conflicts a checkpoint or snapshot for the current interval may include the wrong version of data for blocks written to be more than one node, in some embodiments. Thus, any recovery made using such a snapshot may result in data corruption.

In general, replication target 140 and interval coordinator 120 may have no way of knowing the proper order of multiple writes to a single data block, and thus no way of resolving the ordering ambiguity. In order to ensure that the consistency checkpoint or snapshot generated at the end of the current consistency interval has a correct (i.e. consistent) version of the data, the data block may be read from primary storage 130 and sent to replication target 140, in certain embodiment. In some embodiments, interval coordinator 120 may request that a particular node read the data for a conflict block from primary storage 130 and forward it to replication target 140. In other embodiments, however, interval coordinator 120 may be configured to directly read the data from primary storage 130 and forward it to replication target 140.

In some embodiments, writes conflicts may be resolved by determining the correct ordering of conflicting writes to a data block using specific knowledge of the data being written. For example, in one embodiment, the replicated data may be for a shared database and replication target 140 may be able to inspect the contents of each conflicting write and determine from the individual contents of each write their correct ordering. For instance, in one embodiment, each write to the database may include a timestamp or a global sequence number that may allow replication target 140 to determine the correct ordering of writes. In other embodiments, however, replication target 140 and interval coordinator 120 may not be able to determine the correct ordering of conflicting writes to the same data block and thus may read, or cause to be read, data for the conflict block from primary storage 130 to ensure that the replicated data is consistent with the primary data at the time of the consistency interval transition, and thus, when a consistency checkpoint or snapshot is generated.

One benefit to having source nodes, such as nodes 110, 112, and 114, suspend writes and/or write completions during consistency interval transitions is that it allows data for a conflict block to be read from primary storage 130 before any of the nodes overwrite that block during the next interval, according to some embodiments. Thus, if source nodes are allowed to continuing writing data during consistency interval transitions, one of the nodes may overwrite a conflict block, thus preventing interval coordinator 120 and/or replication target 140 from resolving that conflict by obtaining the latest version of data for that block from primary storage 130.

Alternatively, as noted above, there may also be conflict between one or more completed writes to a data block and an in-progress or uncompleted write to the same data block. For example, when the current interval ended, a node may have suspended a write to a conflict block. In such a case, interval coordinator 120 may request, via a message or any other form of communication, that the node holding the suspended in-progress write completion that write including a special indication that the write completion is resolving a conflict and that the write should overwrite early writes to the conflict block and therefore be included in any checkpoint or snapshot generated for the just ended interval. By requesting completion of the in-progress write, interval coordinator 120 may eliminate the need to determine the order of other, previously completed, writes to the same block, and may also avoid a read operation to get the last written version of the data.

If interval coordinator 120 and/or replication target 140 cannot resolve a conflict block, such as in the event that one of the nodes has crashed or running very slowly or if the block cannot be read from primary storage 130, the current interval may be considered invalid and combined with the next interval to make one, larger interval, as will be discussed in more detail below.

After resolving all block conflicts, interval coordinator 120 may send a message to all nodes informing them that the current interval is closed and that all writes and write completions may be resumed, in some embodiments. The interval coordinator may also send a completion message to the replication target regarding the successful resolution of all block conflicts. In response, the replication target may generate a consistency checkpoint or snapshot of the data, thereby creating a consistency point in the replicated data corresponding to the end of the consistency interval. Alternatively, in other embodiments, each source node may be configured to send consistency interval markers to the replication target after completing all processing, including conflict resolution processing, for the current interval. Thus, the replication target may generate a consistency point or snapshot in response to receiving consistency interval markers from every node, according to some embodiments.

In some embodiments, interval coordinator 120 may send a single message that serves multiple purposes to nodes. For example, in one embodiment, the interval coordinator may send a custom message to each node that includes: a final list of block conflicts, permission to resume writes for non-conflict blocks, a list of blocks the node should forward from primary storage to the replication target, and a list of in-progress writes that the node should complete to resolve block conflicts. In response to such a message, each node may be configured to resume writes to non-conflict blocks, send the requested nodes to the replication target, complete the designated in-progress writes, and send a consistency interval marker message to the replication target (and/or the interval coordinator), according to some embodiments. As noted above, when the replication target (and/or interval coordinator) receives a consistency interval marker message from every node, processing for the current interval may be considered complete and a checkpoint or snapshot of the data may be generated. Thus, in some embodiments, the interval coordinator may send individual messages for each step of the block resolution process, while, in other embodiments, the interval coordinator may send a single message to each node containing all the information that node needs in order to complete interval transition processing and block conflict resolution.

In some embodiments, the nodes may be configured to start sending data for a new consistency interval before all block conflicts for the current interval have been resolved. Thus, the replication target may receive writes for a new interval while also receiving conflict resolving writes for the current interval. Accordingly, replication target 140 may, in some embodiments, be configured to maintain separate write logs, not only for each node but also for each active interval. Once all block conflicts for the current ending interval have been resolved and the consistency checkpoint generated, replication target 140 may be configured to delete or otherwise clean up the write logs for the current interval, in one embodiment.

While the above description of block conflict resolution generally refers to either the interval coordinator or the replication target resolving write conflicts on blocks, in some embodiments, a separate shared-write coordinator or block coordinator may resolve such conflicts. For example, in some embodiments, a shared-write coordinator, such as shared-write coordinator 150 may be configured to resolve write conflicts. Interval coordinator 120 may forward a list of conflict blocks to shared-write coordinator 150 during the interval transition and rely upon shared-write coordinator 150 to resolve the conflicts. Shared-write coordinator 150 may perform the same functions to resolve write conflicts described above regarding interval coordinator 120. Additionally, both interval coordinator 120 and shared-write coordinator 150 may reside on a single device or may be part of replication target 140, according to various embodiments. Also, in some embodiments, the number and length of intervals used by the interval coordinator and the shared-write coordinator may not be the same. For instance, there may be more shared-write intervals as long as consistency intervals correspond to a shared write coordination interval.

Thus, in some embodiments, replication target 140 may perform all the functionality of a replication target, an interval coordinator and a shared-write coordinator. In another embodiment, however, interval coordinator 120 may perform all functionality of both an interval coordinator and a shared-write coordinator separately from replication target 140. Furthermore, interval coordinator 120 and/or shared-write coordinator 150 may reside on virtually any node in the distributed or clustered environment, such as on any of nodes 110, 112 and/or node 114, as well as on replication target 140, or may also reside on a separate, dedicated device or devices.

When implementing consistency interval marker based replication in a write shared situation, interval coordinator 120 may, during a consistency interval transition and before resolving block conflicts, request that all nodes suspend writes to the blocks in conflict. Thus, in some embodiments, each node may temporarily suspend all writes to all blocks and then, after receiving a list of conflict blocks (whether provisional or final), resume writes to block that are not on the block conflict list. However, source nodes may be configured to include such writes to non-conflict blocks as part of the next, new consistency interval, rather than the currently ending interval. Additionally, in some embodiments, when writes cross the consistency interval boundary, some writes may be assigned to one interval and others may be assigned to a next interval. As noted above, nodes may include the interval ID along with writes, allowing the replication target to distinguish between writes for different consistency intervals during a consistency interval transition. In some embodiments, Nodes may suspend writes to conflict blocks until receiving a message from interval coordinator 120 confirming that all conflicts have been resolved.

When implementing consistency interval marker based replication, as described herein, replication target 140 may store received writes in one or more logs, according to some embodiments. In one embodiment, replication target 140 may maintain a separate write log for each node, while in other embodiments, replication target 140 may maintain only a single log file, but may include a node identifier when storing the writes. Thus, in general, replication target 140 may be configured to store (and access) each received write on a node-specific basis. Alternatively, in one embodiment, only interval identities and node-specific interval completions may be logged.

Additionally, recovery information, such as in-progress writes "scoreboards", synchronous write logs, or other types of recover information, may be maintained for the data being replicated. Thus, in the event of a node (either a source node, the interval coordinator or a shared write consistency coordinator) crashing, the recovery information may be used to reconstruct a consistent data image for replication. For example, when maintaining an in-progress writes scoreboard using a bitmap, individual bits representing ranges or regions of data storage are marked (e.g. set to 1) when the corresponding region is modified/written to. A bit may be cleared when writes to the corresponding region have been completed and/or logged successfully. In the event of a node crashing, the recovery information may be used to determine those regions of the data that must be rebuilt or made consistent for the replicated backup. While in some embodiments, replication target 140 may maintain both node-specific write logs and recovery information, in other embodiments, either the write logs, the recovery information or both may be maintained by the source nodes or by one or more other processes/entities in the distributed environment. In general, any method or manner of persisting a particular write may be used as long as information that the particular blocks were modified can be retained (or at least recovered) between the times blocks are written to the primary storage until all replication processing is complete.

Target Controlled Consistency Interval Replication

In some embodiments, a replication target, such as replication target 140, may perform some or all of the same functions as an interval coordinator. Thus, the replication target may send out interval start and end messages as well as track and resolve block conflicts. When utilizing target controlled consistency interval replication, source nodes, such as nodes 110, 112 and 114, may initially register themselves with replication target 140 and replication target 140 may respond by sending each node the current interval ID, according to some embodiments. As the nodes send writes, replication target 140 may store a copy of each write in a node-specific log and may also maintain a list of blocks modified by each node. Thus, when implementing target controlled consistency interval replication, the replication target may stream, or store, the received writes into logically separate logs and may also retain copies of the blocks written in memory, again logically separated by source (i.e. node).

Additionally, replication target 140 may maintain a list of block conflicts needing resolution. When an interval ends, replication target 140 may not have to request lists of modified blocks from the nodes as it may already have this information from the individual writes, according to some embodiments. The resolution of individual block conflicts may be performed as described above when using a separate consistency interval coordinator, in some embodiments.

At the end of a consistency interval, replication target 140 may, in some embodiments, send a message to all nodes signaling the end of the current interval. In one embodiment, each node may send a specific acknowledgment message to replication target 140 in response to the interval end message, while, in other embodiments, nodes may not send a specific acknowledgement message but instead may merely begin including the new interval's ID in writes to the replication target as an acknowledgement of the interval transition. However, if a node has no new write operations to send to the replication target, a specific interval end message may be required in some embodiments.

After a consistency interval has ended, replication target 140 may not immediately generate a consistency checkpoint or snapshot, according to some embodiments. Instead, in some embodiments, the replication target may hold the accumulated writes for one or more additional intervals to ensure that any writes arriving late (i.e. after the end of the interval) may also be included in the generated checkpoint or snapshot. Thus, in some embodiments, replication target 140 may include node-specific write logs for more than one interval. For example, replication target 140 may, in one embodiment, be configured to wait two consistency interval lengths before generating a checkpoint for a consistency interval. Thus, while receiving writes during consistency interval 3, replication target 140 may, in some embodiments, be holding the received writes for intervals 1 and 2. Once interval three has ended, the replication target may then generate a checkpoint or snapshot of the data from interval 1, according to one embodiment. In some embodiments, replication target 140 may not perform any conflict resolution processing until after waiting sufficient time to ensure the receipt of any late arriving writes. In other embodiments, however, replication target 140 may analyze and perform conflict resolution immediately after an interval as ended and perform additional conflict resolution if required by late arriving writes.

Another method, according to some embodiments, to help ensure that all writes for a consistency interval have been received before generating a checkpoint or snapshot, may be to have the source nodes include a node-specific sequence number with each write sent to the replication target. Thus, in some embodiments, replication target 140 may be configured to determine that one or more writes have not been received, based on the sequence numbers, and request the resending of those writes. Alternatively, in other embodiments, each node may be configured to send a list of IDs for the writes associated with a consistency interval, thus allowing the replication target to verify that it has received all the writes sent by the node. In one embodiment, each node may include node-specific sequence numbers and may also include the sequence number of the last write sent in an acknowledgement to an interval transition message from replication target 140. In general, consistency interval marker based replication, with or without block conflict resolution, may include the ability for a replication target to determine whether not it has received all the writes sent from source nodes during a consistency interval before generating a consistency checkpoint or snapshot for that interval.

When including block conflict resolution in target controlled consistency interval replication, replication target 140 may compare the writes it has received from all source nodes to determine whether there are any block conflicts, i.e. two nodes writing to the same block during the same consistency interval. In some embodiments, the replication target may be able to determine the correct ordering of writes to a single block. For example, in one embodiment, replication target 140 may have specific knowledge of the structure and/or nature of the data being written, such as for a custom database application, and thus may be able to use the content of writes to determine their proper ordering. For instance, as described above, the replication target may be able to use sequence numbers, transaction IDs or other characteristics of the data being written to determine the correct ordering of the writes and thus, the final (i.e. correct) state of the block at the end of the consistency interval.

Additionally, in some embodiments, the source node may include node-specific timestamps in each write sent to replication target 140 and replication target 140 may be able to determine the proper ordering of multiple writes to a single block based upon those timestamps. However, since individual clocks used for timestamps from different nodes may be skewed with respect to each other, replication target 140 may only be able to determine the correct order for writes sent sufficiently apart in time to overcome skew and drift between the source nodes' individual clocks, according to one embodiment. Thus, even if nodes include timestamp information with each write, replication target 140 may not be able to always determine the proper ordering of writes sent close together in time.

If replication target 140 cannot determine the proper ordering of multiple writes to a single block, replication target 140 may be configured to request that one of the nodes, such as node 110, read the block from primary storage 130 and forward it to replication target 140, as described above regarding interval coordinator 120. As noted above, the data read from the primary storage 130 may not be valid if any node has overwritten the relevant block during a later consistency interval. Replication target 140 may, in one embodiment, be configured to search node-specific write logs for later intervals when determining whether or not a conflict block was overwritten in a later interval. Thus, in some embodiments, the nodes may be configured to suspend writes to conflict blocks until all conflicts have been resolved, as discussed above.

Combining Consistency Intervals

If a conflict block was overwritten during a later interval before the conflict was resolved, the current consistency interval may be declared invalid and combined with one or more later intervals, according to one embodiment. For example, replication target 140 may use a 1 second consistency interval length, and may have generated a consistency checkpoint for a consistency interval ending at time 2:15:59. If, in this example, the consistency interval ending at 2:15:30 includes two writes to the same block for which the proper ordering cannot be determined, replication target 140 may search the write logs for the consistency interval ending at 2:15:31 for writes to the same conflict block. If, the consistency interval ending at 2:15:31 includes only a single write to the conflict block, or alternatively, two or more writes for which the ordering can be determined, that data may be used for the conflict block and the two consistency intervals (ending at 2:15:30 and 2:15:31, respectively) may be combined into single, two second consistency interval, according to some embodiments. Thus, replication target 140, in this example, may not store a consistency checkpoint for the consistency interval ending at 2:15:30, in one embodiment.

If, using the same example from above, the consistency interval ending at 2:15:31 also included multiple writes to the conflict block and the ordering of those writes cannot be determined, replication target 140 may search yet later consistency intervals for the contents of the conflict block. If say, the consistency interval for 2:15:32 does not include any writes to the conflict block, the replication target may, in some embodiments, request that a node, such as node 110, read the contents of the block from primary storage 130, which would represent the correct contents of the block at the end of the 2:15:31 interval (since no node has overwritten it since). Replication target 140 may, in some embodiments, then use that data to resolve the conflict for the block in question and combine the two consistency intervals ending at 2:15:30 and 2:15:31 into a single, 2 second, interval, as described above. Please note, that in both of the above cases, the state of the replicated data may not be consistent at 2:15:30, but may be consistent at both 2:15:29 and 2:15:31. In another example, one node may be slower to respond to an interval completion message than two other nodes that may respond more quickly. Thus, any conflicts between the two quicker nodes may already be resolved by the time the first node does respond to the interval completion message. When the first node does respond, it may or may not have additional conflicts with the other two nodes. If the first node does not conflict with any writes from the other two nodes, no further conflict resolution is required.

In general, consistency interval marker based replication may be seen as a means for coordinating across virtually any collection of data sources which need to be copied or replicated for various copy services, or that need to be asynchronously processed for various other services. Additionally, consistency interval marker based replication may be implemented for any collection of systems that share one or more data volumes and replicates to other, secondary volumes, according to various embodiments. The data sources for consistency interval marker based replication may represent any level of the typical I/O stack. For instance, volume managers, file systems, databases storage replicators (in hardware or software), and end-user applications are a few types of data sources for which consistency interval marker based replication may be utilized. When implementing consistency interval marker based replication, various asynchronous copy services may be performed in a generally I/O efficient and scalable manner in clustered and/or distributed environments including multi-host environments. Such asynchronous copy services may include, but are not limited to asynchronous mirroring, replication, snapshots, finely grained in-time backups for continuous data protection, among others.

Please note that the networked computing environment illustrated in FIG. 1 represents only one possible environment in which consistency interval marker based replication, with or without block conflict resolution, may be implemented. For example, network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace).

Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, ring, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to various embodiments.

In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSDs), or other asymmetric, out-of-band, or shared storage models. Furthermore, the network environment illustrated in FIG. 1, may represent any of various types of distributed or clustered networking environments, according to various embodiments. For example, in one embodiment, consistency interval marker based replication may be implemented in a distributed environment, such as a multi-node system in which blocks of data on a storage volumes are virtualized across various nodes in the distributed environment, or in a clustered environment, such as a multi-node system in which all volume data is distributed uniformly across all nodes sharing the volumes.

Similarly, nodes 110, 112 and 114 may, in different embodiments, represent any of a number of different types of applications and/or processes at various levels in an I/O stack, such as volume managers, file systems, databases storage replicators (in hardware or software), and end-user applications, among others. Additionally, primary storage 130 and replication target 140 may represent any of various sorts of single node or multi-node storage devices and/or storage systems including, but not limited to, disk drives, disk arrays, storage controllers, array controllers, tape drives, optical drives, tape libraries, RAID systems, and/or object based storage devices (OBSD).

Various aspects of consistency interval marker based replication and block conflict resolution will be described in more detail below.

Figure 2:
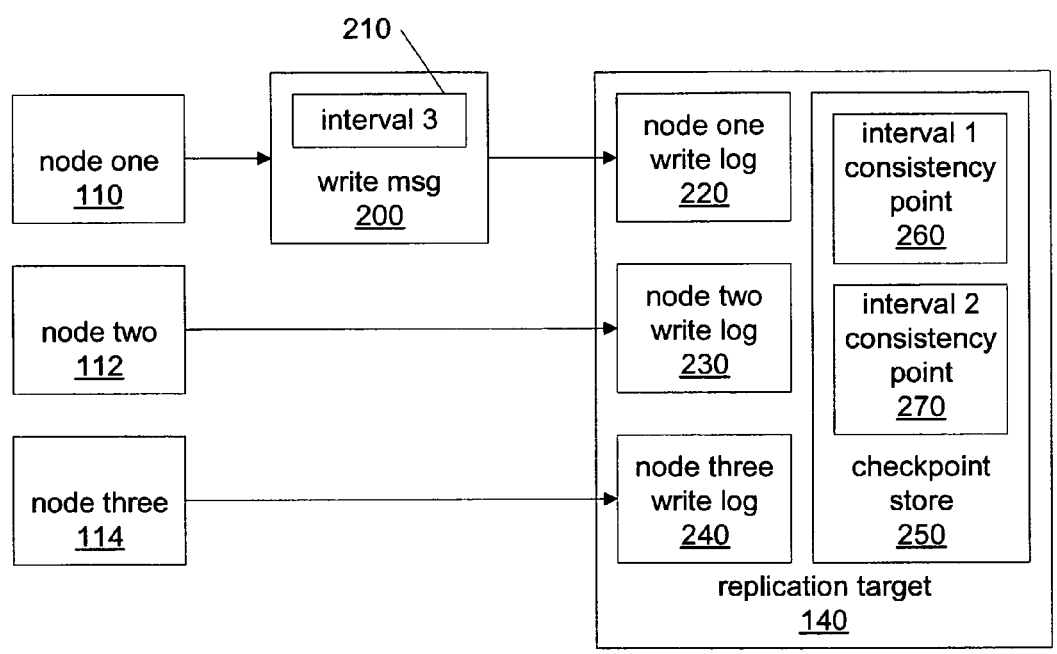
FIG. 2 is a block diagram that illustrates the logical association between nodes, the replication target and replicated data, according to one embodiment.

FIG. 2 is a block diagram illustrating the relationship between source nodes 110, 112 and 114, replication target 140, and the replicated data, according to one embodiment. As described above, multiple source nodes, such as node one 110, node two 112, and node three 114, may send write requests to replication target 140 asynchronously from the I/O stream to primary storage 130. In some embodiments, the message used to send a write to replication target 140 may include a current interval identifier. For example, node one 110 may send write message 200 to replication target 140 and may include interval identifier 210 in the message. Thus, in the embodiment and example illustrated by FIG. 2, node one may send writes during consistency interval 3. While, simple, numeric interval identifiers are used herein by way of example to identify consistency intervals, in other embodiments, more complex interval IDs, such as ones including date/time information, replication target information, or even universally unique global identifiers, may be also used.

As described previously, replication target 140 may maintain multiple node-specific write logs to store the writes from nodes during consistency interval. Thus, as illustrated in FIG. 2 according to one embodiment, replication target 140 may maintain three separate write logs, node one write log 220, node two write log 230, and node three write log 240, to store write I/Os from node one 110, node two 112, and node three 114, respectively. Additionally, in other embodiments, replication target 140 may also maintain different sets of node-specific write logs for different consistency intervals, as noted above. For example, replication target 140 may, in one embodiment, be configured to hold the writes for a previously ended consistency interval while collecting writes for a later consistency interval. Thus, while FIG. 2 illustrates node-specific write logs for only one (the current) consistency interval, replication target 140 may also maintain node-specific write logs for other, previously ended, consistency intervals.

While FIG. 2 shows three independent node-specific write logs, in some embodiments, replication target 140 may store the writes from nodes in different ways. For example, in one embodiment, replication target 140 may store writes from all nodes in a single log configured to separately maintain the node-specific writes. For example, entries for a single, multi-node write log may include a node identifier or may include some other way to determine which writes were sent from which nodes, according to some embodiments. In some embodiments, node-specific write logs 220, 230, and 240 may be stored on disk, while in other embodiments they may be kept only in memory. Although, when maintaining such write logs in memory, replication target 140 and/or nodes 110, 112, and 114 may be configured to maintain recovery information, such as an in-progress writes scoreboard style bitmap, or synchronous write logs for use in case of a system error or crash. In other embodiments however, writes from nodes 110, 112, and 114 may be maintained both on disk and in memory. In general, replication target 140 may be configured to store writes from nodes in any fashion suitable of storing the write data while allowing access the data on a node-specific basis.

After a current consistency interval ends, such as interval 3 in FIG. 2, replication target 140 may generate a consistency checkpoint or snapshot, or otherwise save the data from writes during the interval to a replication store, such as checkpoint store 250. FIG. 2 illustrates checkpoint store 250 including two consistency points already saved, interval 1 consistency point 260 and interval 2 consistency point 270. In one embodiment, a consistency snapshot of the entire data (not just the data written in the current consistency interval) may be generated. In other embodiments however, only those changes to data made during the current interval may be stored in checkpoint store 250 or other replicated data store.

While FIG. 2 illustrates three nodes, three node-specific write logs and three intervals, other embodiments may include many more such nodes, logs and intervals. Logs may also be combined, so that one log includes entries from several nodes or for several purposes. Furthermore, saving consistency points in a checkpoint store on replication target 140 is only one of many possible methods for storing replicated data. In other embodiments, consistency point data may be stored on devices separate from replication target 140, or even forwarded to completely separate replication system.

Figure 3:
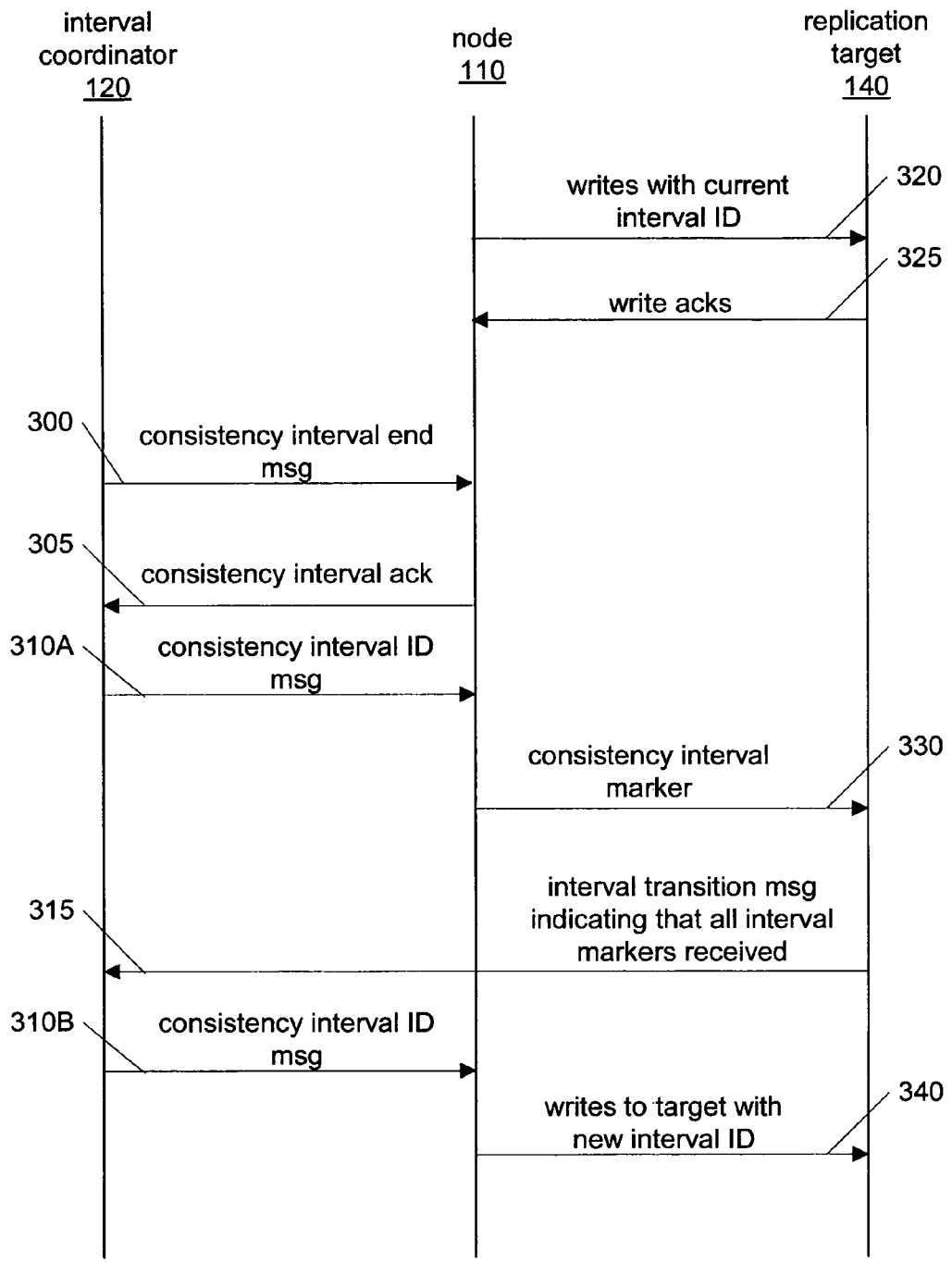
FIG. 3 is a block diagram illustrating, according to one embodiment, the logical flow of communication between a node, an interval coordinator, and a replication target while implementing consistency interval marker based replication.

FIG. 3 is a block diagram illustrating, according to one embodiment, the logical flow of communication between a node, an interval coordinator, and a replication target while implementing consistency interval marker based replication. The logical communication flow illustrated in FIG. 3 represents an example exchange among interval coordinator 120, node 110, and replication target 140 during a consistency interval transition (i.e. the ending of one interval and the start of another). Thus, as described above, node 110 may send writes, each including the ID of the current interval, to replication target 140 and replication target 140 may, in some embodiments, send acknowledgments back to node 110, as illustrated by arrows 320 and 325.

Additionally, in some embodiments, node 110 may maintain or update a recovery map or log indicating blocks or regions of blocks that have been changed. For example, a dirty region bitmap, in which each bit represents a range of data blocks, may be maintained, either for each node, or for all nodes together, according to different embodiments. Alternatively, in other embodiments, a sequential, synchronous, log of all writes may be maintained during the current interval and flushed once a consistency checkpoint or snapshot has been generated for the internal by replication target 140. In general, the term "recovery map" is used herein to refer to any sort of data structure used to store or maintain recovery information regarding the writes sent by the source nodes to the replication target, including, but not limited to, dirty region tracking, synchronous data logs, metadata logs, data change objects, etc. Likewise, the term "log" is used herein to refer to any sort of data structure used to store or maintain a record of operations, such as the data being written, the time, nodes, and/or block numbers involved, in a manner that allows retrieval of individual operations as discrete items which can be ordered in a sequence using a unique identification key associated with each item, including, but not limited to, logs, databases, etc.

Thus, in some embodiments, node 110 may also update a recovery map after sending a write to replication target 140. For instance, node 110 may set (to 1) bits in dirty region bitmap corresponding to the blocks being written. After receiving acknowledgement from replication target 140, node 110 may then clear those bits (to 0). In one embodiment, a single, combined, recovery map may be maintained for all data written by all nodes. In other embodiments, however, a separate recovery map may be maintained for each node. Maintaining a separate recovery map for each node may allow an interval coordinator, such as interval coordinator 120, to perform recovery processes for a crashed node based on the contents of that node's recovery map. Please note that while in some embodiments, each node may interact with and update its own recovery map, in other embodiments, a single recovery process may maintain all the nodes' individual maps based upon information supplied by the nodes.

In certain embodiments, each node may maintain two such recovery maps, one for the currently active consistency interval, and one for the immediately previous consistency interval. Since, in some embodiments, nodes may be sending writes for a new consistency interval while the previous (just ended) interval is still being processed, such as for block conflict resolution. For example, in one embodiment, block conflicts may still be being resolved while nodes are already sending writes (to non-conflict blocks) for the next interval. Thus, when using two recovery maps, a node may use one as an active map for recording changes made during the current interval and may use the other as a replay map for the previous interval. A node may swap the two maps (i.e. make the active map the replay map and clear out the replay map to make it the active map) at interval transitions. Some embodiments may keep maps for more than one previous interval, allowing more flexibility in conflict resolution at the expense of greater memory consumption. As the workings and use of recovery maps, and recovery information in general, are well understood in the art, they will not be discussed in detail herein.

At some point interval coordinator 120 may determine that it is time to end a current interval and thus may send a consistency interval end message to node 110, as represented by arrow 300 in FIG. 1. As discussed above, there are multiple ways that interval 120 may determine when to end a consistency interval. In response to the consistency interval end message, node 110 may send an acknowledgement message back to interval coordinator 120, as indicated by arrow 305. Also, as noted above, node 110 may also suspend completion of writes in response to receiving the interval end message, according to some embodiments. When suspending completion of writes during an interval transition, node 110 may, in some embodiments, continue to send writes to replication target 140, but may not acknowledge the completion of those writes to any application that performed the write originally. Thus, if the node crashes during the interval transition, the application cannot assume that the writes were completed and thus may have no expectations regarding the state of the relevant data, according to some embodiments.

After receiving acknowledgment messages from all nodes in the system, interval coordinator 120 may send another message to all the nodes. In some embodiments, interval coordinator 120 may send a message including the ID of the new interval that is starting, as indicated by arrow 310A. In other embodiments, however, interval coordinator 120 may include the new interval ID in the interval end message and, after receiving acknowledgements from all nodes, interval coordinator 120 may send a message signaling the nodes to resume suspended write completions. When resuming suspended write completions, node 110 may notify the application that originally performed a write that was suspended of the successful completion of that write, according to certain embodiments.

After node 110 has sent all writes for the current interval (that is, the interval just ending), node 110 may, in some embodiments, send a consistency point or a consistency interval marker message to replication target 140. Node 110 may inform replication target 110 that it has finished sending writes for an ending interval in a number of ways. In some embodiments, node 110 may send a specific consistency interval marker message. In other embodiments, however, node 110 may include a consistency point indicator in the first write of the new interval. After receiving consistency interval markers from all nodes in the system, replication target 140 may send a message, such as a interval transition message, to interval coordinator 120 indicating that all writes for the ending interval have been sent by the nodes, as indicated by arrow 315.

In some embodiments, interval coordinator 120 may wait until receiving an interval transition message from replication target 140 indicating that all nodes have sent their respective consistency interval markers before sending a consistency interval ID message to the nodes, as indicated by arrow 310B. Thus, in some embodiments, interval coordinator 120 may send the new interval ID to node 110 at the end of the current interval, such as in a consistency interval end message, while, in other embodiments, interval coordinator 120 may wait until after receiving acknowledgements of the interval transition before sending the new interval ID. In yet other embodiments, interval coordinator 120 may wait until all nodes have sent all writes for the ending interval, indicated by replication target 140 receiving consistency interval markers from all nodes, before sending the new interval ID.

Additionally, in some embodiments, the interval ID message may also indicate that nodes may resume writes and/or write completions, while, in other embodiments, interval coordinator 120 may send a separate message instructing nodes to resume writes and/or write completions. After the interval transition and after node 110 has received the new interval ID from interval coordinator 120, node 110 may then send writes including the new interval ID to replication target 140, as indicated by arrow 340. The process may continue with node 110 sending writes to replication target 140 and replication target 140 acknowledging those writes until interval coordinator 120 ends the new interval with another interval end message.

Please note that the communication flow logically illustrated in FIG. 3 regards consistency interval replication for a system in which multiple nodes are read-sharing one or more data volumes, but in which the data is not write-shared. Thus, no two nodes may be able write to the same block of data at the same time. In other words, the communication flow logically illustrated in FIG. 3 does not include any provision for block conflict resolution, as that will be described in more detail below regarding FIGS. 5-9.

Figure 4:
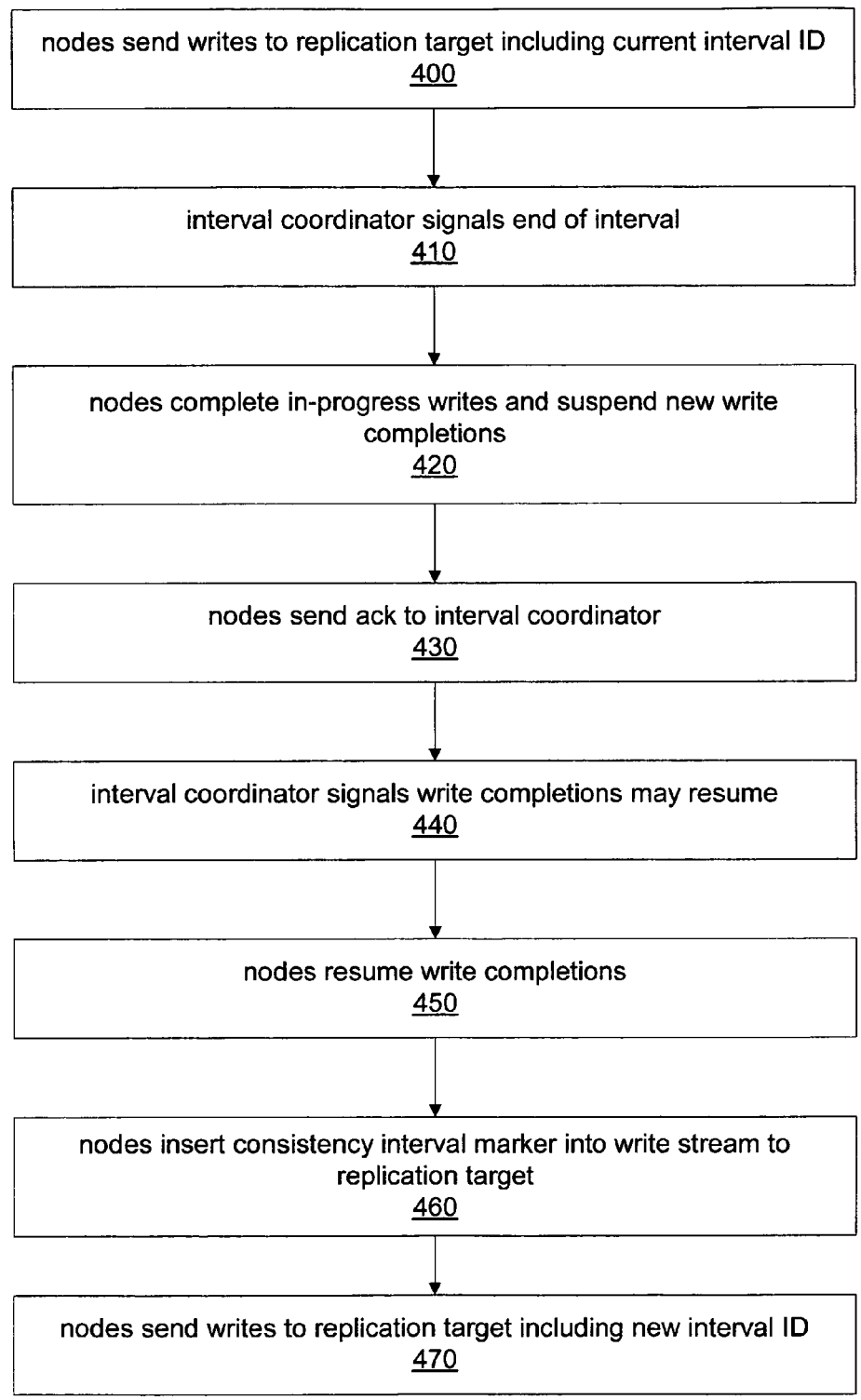
FIG. 4 is a flowchart illustrating one embodiment of a method for consistency interval based replication.

FIG. 4 is a flowchart illustrating one embodiment of a method for consistency interval maker based replication, as described herein. As described above, multiple nodes, such as applications, file systems, or volume managers, etc., may send writes to a replication target including the current interval ID with each write, as illustrated by block 400. For instance, in one embodiment, nodes 110, 112 and 114 may each send writes to replication target 140 and may include the current interval ID with each write. As noted above, replication target 140 may store each write in a node-specific log or may, alternatively store all writes from all nodes in a single log or data structure allowing node-specific access, according to various embodiments.

An interval coordinator, such as interval coordinator 120, may signal the end of the current interval, as illustrated by block 410. For example, interval coordinator 120 may determine the end of the current interval according to a length of time for the interval, while other methods for determining the length of an interval may be used in different embodiments. Interval coordinator 120 may send a message to each node informing the node that the current interval is ending. In response, each node may complete all in-progress writes for the ending interval and suspend completions for any new writes, as illustrated by block 420. For example, each node may proceed to send writes for the new consistency interval to replication target 140, but may not send a completion or acknowledgement to an application or process originally performing the write, as noted above. When sending new writes to replication target 140 after suspending write completions, each node may include the new interval ID with each write in order to allow replication target 140 to differentiate between writes for the previous (now ending) interval and the new interval. Additionally, each node may send an acknowledgement message to interval coordinator 120, as indicated by block 430, letting the coordinator know that the node received the end of interval message and has suspended write completions.

After receiving an acknowledgement from every node, interval coordinator 120 may, in some embodiments, send another message to each node signaling that write completions may be resumed, as indicated by block 440. In response, the nodes may complete any previously uncompleted writes by sending acknowledgments or completion messages to applications or processes originally performing the writes, as indicated by block 450. After all data for the previous (ending) interval has been delivered to replication target 140, each node may send a consistency interval marker or consistency point message to replication target 140, as indicated by block 460, and described above. Once replication target 140 has received consistency points from every node, replication target 140 may inform the interval coordinator that interval processing is completed.

Additionally, replication target 140 may generate a consistency checkpoint or snapshot for the ended interval, or alternatively, may delay generating a checkpoint or snapshot for a time sufficient to ensure that any writes delayed, due to network congestion for example, may arrive, according to some embodiments. As discussed above, replication target 140 may delay generating a consistency checkpoint or snapshot for an additional number of consistency intervals, in one embodiment. However, source nodes may continue sending writes to the replication target and may include the new interval ID with each write, as illustrated by block 470.

While the discussions above in reference to FIGS. 2-4 described consistency interval marker based replication in reference to non-write-shared storage environments, and thus, did not discuss block conflict resolution, the following discussions regarding FIGS. 5-9 will discuss consistency interval marker based replication in write-shared environment and thus will describe block conflict resolution in detail.

Figure 5:
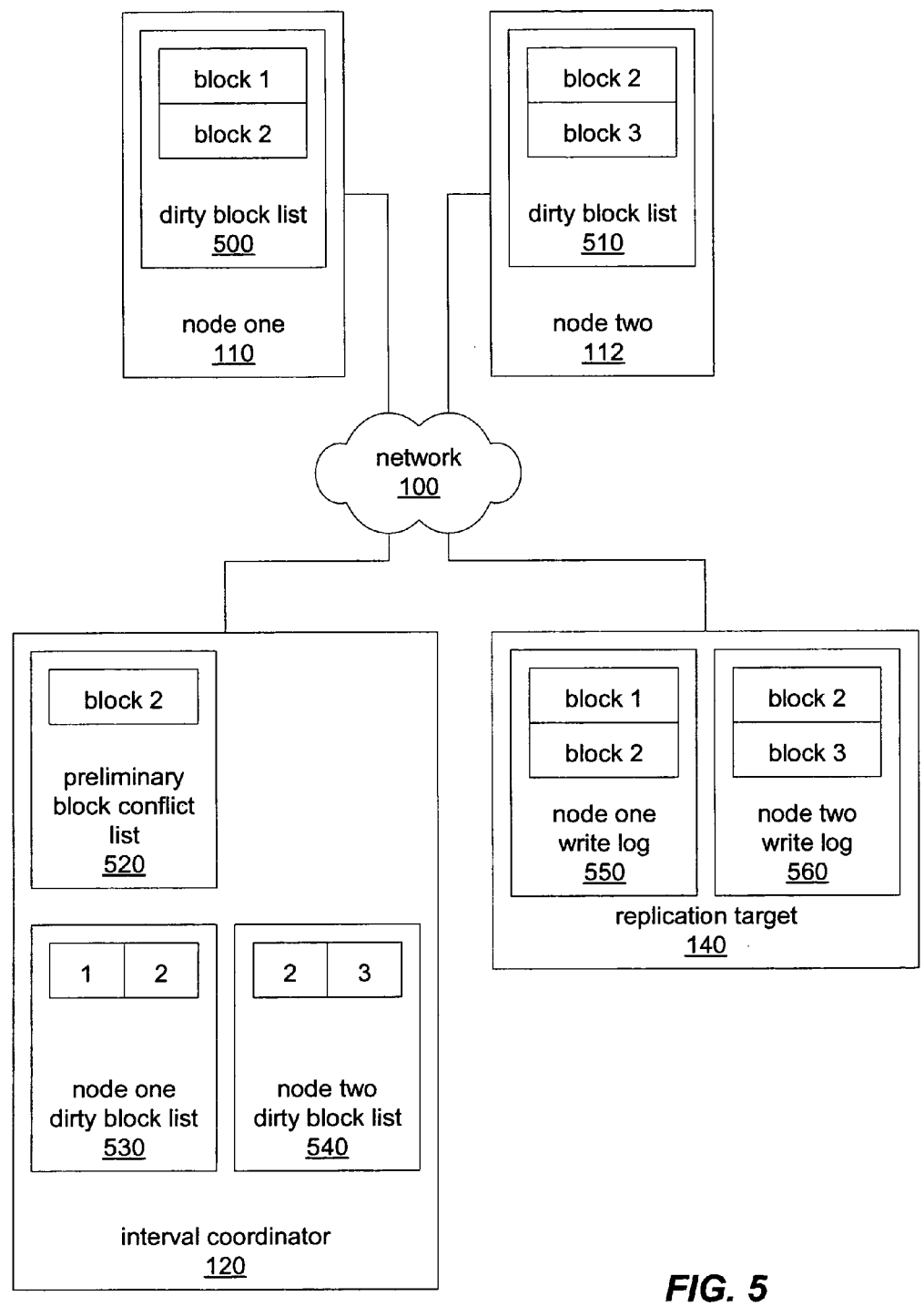
FIG. 5 is a block diagram illustrating, according to one embodiment, a first stage of block conflict resolution, as described herein.

FIG. 5 is a block diagram illustrating, according to one embodiment, a first phase of block conflict resolution, as described herein. For instance, node one 110 and node two 112 may each have sent writes for two blocks to replication target 140 during the current interval. Node 110 may have sent writes for blocks 1 and 2, while node 112 may have sent writes for blocks 2 and 3. Replication target 140 may store the received writes in node-specific write logs, such as node one write log 550 and node two write log 560. Thus, as illustrated by FIG. 5, node one write log may include blocks 1 and 2 from node one 110 and node two write log 560 may include blocks 2 and 3 from node two 112. As noted above, the exact manner and data structure in which replication target 140 maintains the writes received from nodes 110 and 112 may vary from embodiment to embodiment.

Additionally, in some embodiments, nodes one (110) and two (112) may periodically send interval coordinator 120 lists of modified blocks that indicate the blocks modified by each respective node. Thus, node 110 may send a list of modified blocks including blocks 1 and 2 as indicated by dirty block list 500 and node 112 may send a list of modified blocks including blocks 2 and 3, as indicated by dirty block list 510. In response to receiving the lists of modified blocks from nodes 110 and 112, interval coordinator 120 may maintain node-specific lists of modified (or dirty) blocks. Thus, the dirty block list 530 from node one may include blocks 1 and 2, while the dirty block list 540 from node two may include blocks 2 and 3.

Additionally, interval coordinator 120 may maintain a preliminary block conflict list 520 and may update preliminary block conflict list 520 whenever it receives a list of modified blocks from a node. For example, interval coordinator may compare the node one dirty block list 530 and node two dirty block list 540 and determine that block 2 was written to be both node one and node two. Thus, interval coordinator 120 may generate or update preliminary block conflict list 520 to include block 2, according to the embodiment illustrated by FIG. 5. As described above, interval coordinator 120 may send preliminary block conflict list 520 to each node after sending an interval end message and may determine a final block conflict list after receiving final modified block lists from every node, as will be described below regarding FIG. 6.

Figure 6:
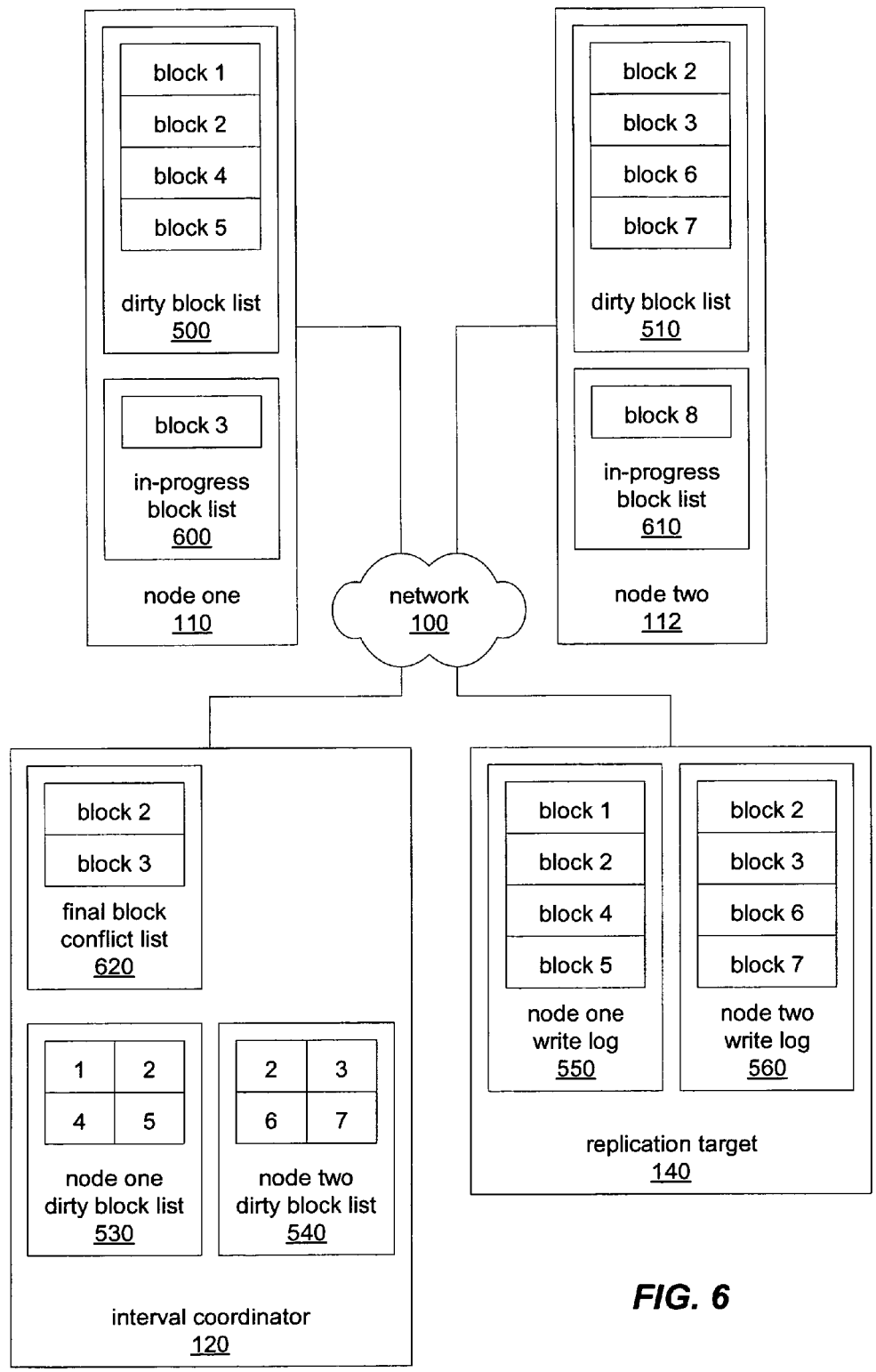
FIG. 6 is a block diagram illustrating, according to one embodiment, a first stage of block conflict resolution, as described herein.

FIG. 6 is a block diagram illustrating a second phase of block conflict resolution as described herein and according to one embodiment. After determining preliminary block conflict list 520, as described above regarding FIG. 5, interval coordinator 120 may send preliminary block conflict list 520 to every node, such as nodes 110 and 112. In response to receiving a preliminary block conflict list from interval coordinator 120, nodes 110 and 112 may suspend writes or completions of writes, including in-progress writes. Thus, node 110 may suspend an in-progress write to block 3, as indicated by in-progress block list 600. Additionally, node 112 may suspend an in-progress write to block 8, even though block 8 may not be a conflict block.

Since receiving an interval end message from interval coordinator 120, nodes 110 and 112 may have completed additional writes for the ending interval. For example, node 110 may have completed in-progress writes to blocks 4 and 5, and node 112 may have completed writes to blocks 6 and 7. Additionally, node 110 may have started a write for block 3, as indicated by in-progress block list 600, and node 112 may have started a write for block 8, as indicated by in-progress block list 610, as noted above. Please note that in-progress block lists 600 and 610 are illustrated in FIG. 6 for discussion and explanation purposes only. Nodes taking part in consistency interval maker based replication with block conflict resolution, as described herein, may not actually maintain such a list of in-progress writes, or may maintain such a list in a different form or format.

Nodes 110 and 112 may also send a final list of modified blocks to interval coordinator 120, according to some embodiments. For instance, node 110 may send a final modified block list including blocks 4 and 5 and node 112 may send a final modified block list including blocks 6 and 7. Thus, interval coordinator 120 may update its node-specific modified block lists, as indicated by node one dirty block list 530 and node two dirty block list 540. In response to receiving final modified block lists from nodes, interval coordinator 120 may generate and distribute to the nodes a final block conflict list, such as final block conflict list 620.

Additionally, as described above, interval coordinator 120 may include conflict-resolving instructions to each node when sending final block conflict list 620. Alternatively, interval coordinator 120 may send such conflict-resolving instructions in separate, individual message to each node, according to certain embodiments.

Regardless of whether interval coordinator 120 sends conflict-resolving instructions along with final block conflict list 620 or separately, the nodes may, in one embodiment, send additional writes to replication target 140 to resolve the block conflicts, according to the conflict-resolving instruction from interval coordinator 120. For example, interval coordinator 120 may request that node 110 complete the in-progress write of block 3, thereby resolving the conflict of block 3. Please note that since the in-progress write of block 3 from node 110 occurs after the completion of the write to block 3 from node 112, interval coordinator 120 may determine that the data for block 3 from node 110 is the final (in terms of the current consistency interval) data for block 3. Similarly, interval coordinator 120 may request that node 112 read the data for block 2 and forward it to replication target 140. Please note that interval coordinator could also have requested that node 110 read and forward data for block 2, however, in some embodiments, interval coordinator 120 may distribute conflict-resolving instructions across multiple nodes in order to limit the amount of time and network bandwidth used by each node during conflict resolution, and to take advantage of possible data caching on the individual nodes or data access hardware.

Interval coordinator 120 may send such conflict resolving instructions to nodes in various forms, according to different embodiments. For example, in one embodiment, interval coordinator 120 may simply include a list of blocks that a node is to read and send to replication target 140.

When sending conflict resolving writes to replication target 140, in response to receiving conflict-resolving instructions from interval coordinator 120, a node may mark or flag the writes as conflict-resolving so that replication target 140 may know to overwrite any previously received data for the relevant blocks with the data from the conflict-resolving writes. For example, a particular tag or flag may be included with a conflict-resolving write in one embodiment. In other embodiments, however, replication target 140 may assume that any writes including a consistency interval's ID received after that interval has ended to be conflict-resolving writes. Alternatively, in yet other embodiments, interval coordinator 120 may send replication target 140 a message indicating which blocks will be overwritten by conflict-resolving writes and thus replication 140 may be able to determine which writes from nodes are conflict-resolving writes, such as to handle the case where an earlier (non-resolving) write is received later than a conflict resolving write for an interval (which can happen if nodes process and deliver data to the target with different delays).

Figure 7:
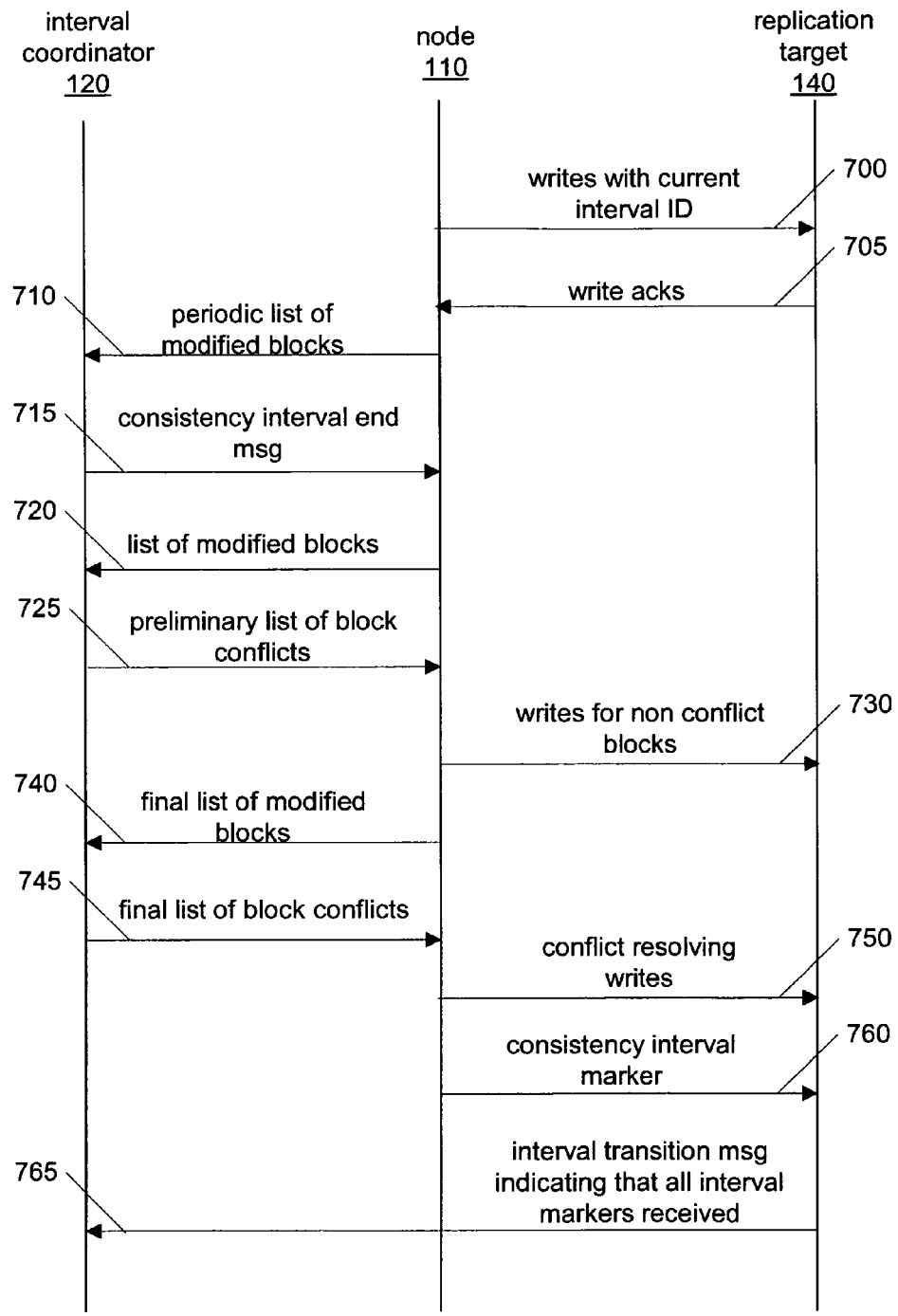
FIG. 7 is a block diagram illustrating the logical communication flow between a node, an interval coordinator, and a replication target while implementing consistency interval replication with block conflict resolution, according to one embodiment.

FIG. 7 is a block diagram illustrating the logical communication flow between a node, an interval coordinator, and a replication target while implementing consistency interval replication with block conflict resolution, according to one embodiment. Similarly to FIG. 3, described above, FIG. 7 shows the communication between node 110, interval coordinator 120 and replication target 140 for an interval transition including block conflict resolution, as described herein and according to some embodiments. Thus, FIG. 7 (like FIGS. 5 and 6) illustrates consistency interval marker based replication in an environment that includes write-shared data storage in which multiple nodes may write to the same data block, thus replication target 140 may receive multiple writes from different nodes to the same data block. As described above, node 110 may send writes to replication target 140 including the current interval ID with each write and replication target 140 may response with acknowledgement messages, as illustrated by arrows 700 and 705.

Unlike consistency interval marker based replication without block conflict resolution, consistency interval marker based replication with block conflict resolution involves nodes, such as node 110, periodically sending interval coordinator 120 lists of the blocks modified by the writes sent from the nodes, as indicated by arrow 710. Thus, periodically throughout a consistency interval, node 110 may send a message to interval coordinator 120 including a list of those blocks being modified by the writes from node 110. Node 110 may only include in such a list blocks that have been modified since the last time node 110 sent such a list to interval coordinator 120. However, in some embodiments, nodes may not send lists of modified blocks periodically, but instead may send a complete list of modified blocks to interval coordinator 120 in response to a consistency interval end message from interval coordinator 120. Interval coordinator 120 may also maintain node-specific lists of modified blocks for use in block conflict resolution, such as dirty block lists 530 and 540, described above regarding FIGS. 5 and 6.

As described above, consistency interval 120 may send an interval end message to node 110 at the end of the current interval, as shown by arrow 715. In response to the interval end message, node 110 may send interval coordinator 120 an updated list of modified blocks, as illustrated by arrow 720. As noted above, node 110 may send a list of only those blocks modified since the last time node 110 sent such a list to interval coordinator 120 (during the current consistency interval). Interval coordinator 120 may analyze the lists of modified blocks from all nodes to identify block conflicts where two nodes sent writes for the same data block. Interval coordinator 120 may send a preliminary list of block conflicts to each node as indicated by arrow 725. In some embodiments, this list may be preliminary because some nodes may not have completed all writes for the ending interval. In response to receiving a preliminary list of block conflicts, node 110 may suspend all writes to any conflict block but may, in some embodiments, send writes for non-conflict blocks in the new interval, as indicated by arrow 730. While not illustrated in FIG. 7, replication target 140 may acknowledge writes for non-conflict blocks as described above regarding arrow 705.

Additionally, after receiving a preliminary list of block conflicts from interval coordinator 120, node 110 may send a final list of modified blocks to interval coordinator 120, as indicated by arrow 740. For example, node 110 may send a list of blocks modified since the last list of modified blocks was sent to interval coordinator 120. In another embodiment, node 110 may respond to a preliminary list of block conflicts with a complete list of all blocks modified during the current interval. After receiving the final lists of modified blocks from all nodes, interval coordinator may, as described above, send a final list of block conflicts to each node, as indicated by arrow 745. In some embodiments, interval coordinator 120 may send identical messages to all nodes with a list that includes all block conflicts.

In other embodiments, however, interval coordinator 120 may send individual messages to each node with the final list of block conflicts that also includes specific instructions for that node to perform for conflict resolution. For example, as described above, interval coordinator 120 may request node 110 to read the data for a specific block and forward that data to replication target 140. When sending such conflict resolving writes to replication target 130 as indicated by arrow 750, node 110 may, in some embodiments, include an indication that the write is a conflict-resolving write and that the data in the conflict-resolving write should overwrite any other writes to the same block (within the ending consistency interval), as described above.

Interval coordinator 120 may also request that node 110 complete an in-progress write for a conflict node and in response, node 110 may send the write to replication target 140, in some embodiments including an indication that this write is a conflict-resolving write. In response to receiving conflict-resolving writes from node 110, replication target 140 may use the data from the conflict-resolving writes when generating a consistency checkpoint or snapshot for the ending consistency interval. Additionally, replication target 140 may, in some embodiments, send an acknowledgment message to node 110 indicating that replication target 140 received the conflict-resolving writes, as described above regarding arrow 705.

After completing all conflict-resolving instructions from interval coordinator 120, whether included with the final list of conflict blocks or sent in individual messages, node 110 may, in some embodiments, send a consistency point or consistency interval marker message to replication target 140, as indicated by arrow 760. As described previously, once replication target 140 has received consistency point messages from all nodes, replication target 140 may send an interval transition message, as indicated by arrow 765, to interval coordinator 120 reporting that all nodes have finished all conflict-resolving processing and have sent their respective consistency point messages. Thus, interval coordinator 120 may determine that all processing for the ending interval may be complete, according to one embodiment.

Figure 8:
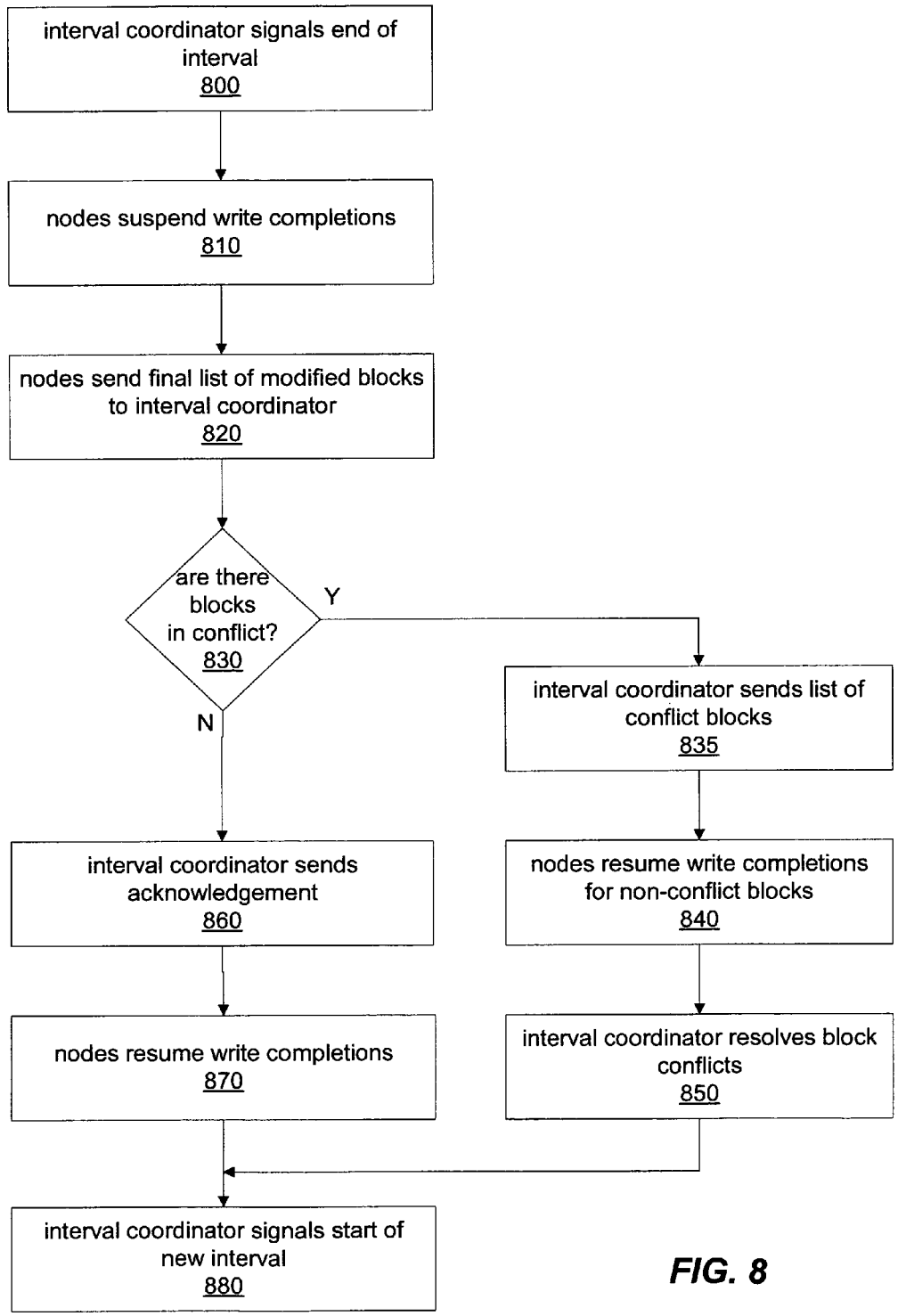
FIG. 8 a flowchart illustrating one embodiment of a method for block conflict resolution, as described herein.

FIG. 8 is a flowchart illustrating, according to one embodiment, a method for consistency interval marker based replication with block conflict resolution, as described herein. As illustrated by block 800, at the end of a consistency interval, interval coordinator 120 may signal the end of the interval, as described above and the nodes may suspend write completions, as indicated by block 810 and discussed above.

As illustrated by block 820, each node may send a final list of blocks modified during the consistency interval. For example, in one embodiment, each node may send a single, complete, list of all blocks modified since the start of the consistency interval. In another embodiment, each node may periodically send lists of modified blocks and may only send, as a final modified block list, a list of those blocks changed since the last modified block list was sent to interval coordinator 120.

Interval coordinator 120 may also analyze the received list of modified blocks for each node to determine whether there are any blocks in conflict, as illustrated by block 830, as discussed above. If there are blocks in conflict, interval coordinator 120 may send a message to all nodes including the final list of conflict blocks, as indicated by block 835, and, in response, the nodes may resume write completions for blocks that are not in conflict, as indicated by block 840. Additionally, interval coordinator 120 may resolve the block conflicts, as illustrated by block 850 and as described in detail below regarding FIG. 9. If there were no conflicts, as indicated by the negative output of block 830, the interval coordinator may simply send a message acknowledging receipt of the lists of modified blocks from each node, as indicated by block 860 and in response, the nodes may resume any suspended writes or write completions, as illustrated by block 870.

As described above, interval coordinator 120 may send messages to certain nodes requesting the forwarding of data for conflict blocks to replication target 140 and may also request the completion of suspended in-progress writes to resolve a block conflict, according to some embodiments. After resolving all block conflicts, or if there were no block conflicts, the interval coordinator may signal the start of a new interval, as indicated by block 880. For example, the interval coordinator may send a message to all nodes including the new interval's interval ID, in some embodiments. In other embodiments, however, the nodes may have already received the new interval ID, and may already be sending writes including that interval ID, and thus the interval coordinator may send a message informing all nodes that all conflicts for the ending interval are resolved, and thus the nodes may begin or resume sending writes for all blocks, including the previous conflict blocks, as described above. Additionally, in some embodiments, the nodes may, in response to receiving a message regarding the completion of interval transition processing from interval coordinator 120, perform any node-specific processing, such as cleaning up recovery information stored for the completed consistency interval, as discussed previously.

Figure 9:
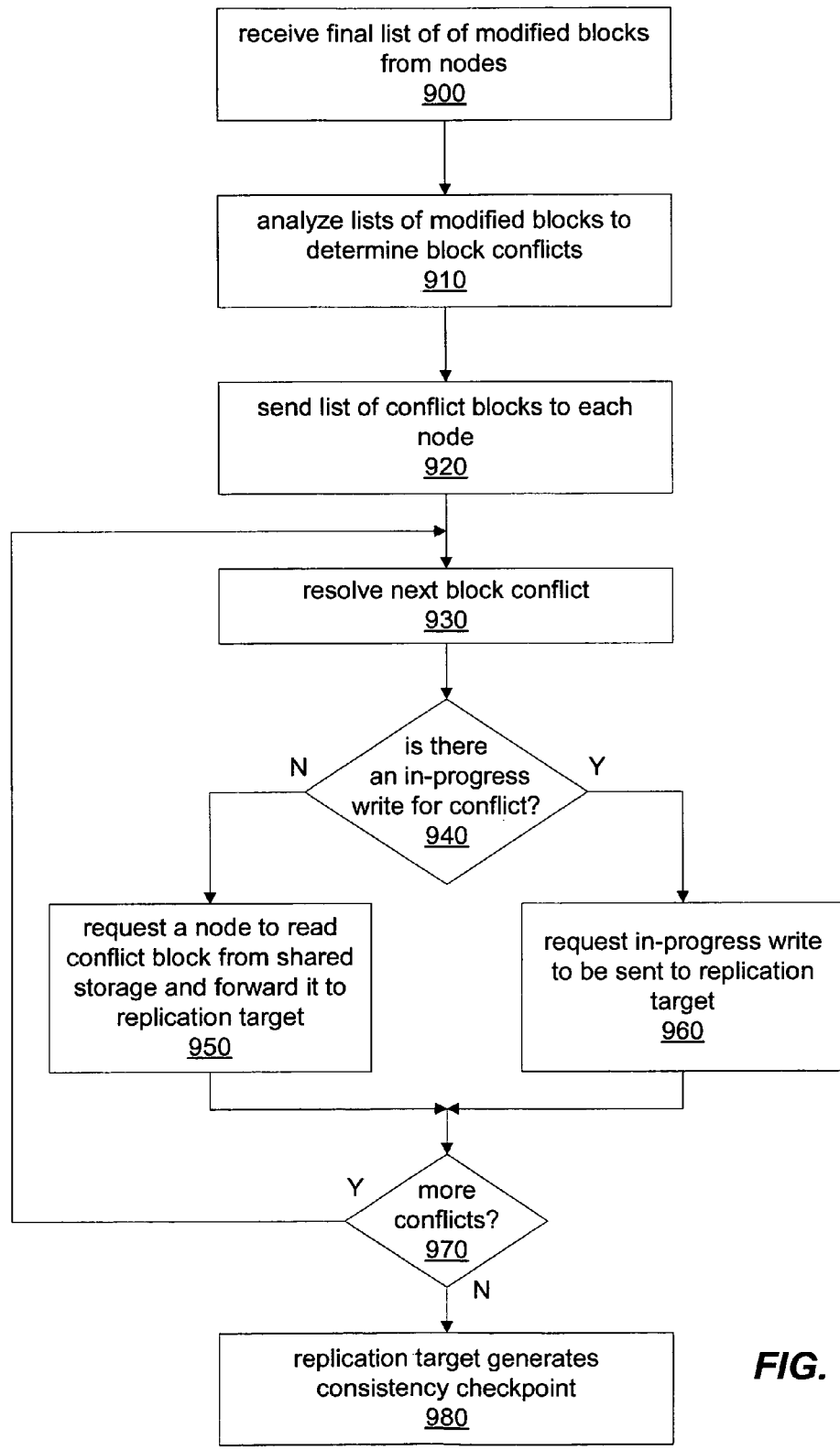
FIG. 9 is a flowchart illustrating one embodiment of a method for solving block conflicts within block conflict resolution, as described herein.

FIG. 9 is a flowchart illustrating one embodiment of a method for block conflict resolution as described herein. After receiving a final list of modified blocks from each of the nodes, as illustrated by block 900, interval coordinator 120 may analyze the list of modified blocks to determine any block conflicts, as illustrated by block 910, and described above. For example, the interval coordinator may go through the list from each node comparing it to the lists from every other node to determine blocks written to by more than one node. After determining a list of blocks with conflicts, interval coordinator 120 may send the list of block conflicts to each node, as indicated by block 920. Interval coordinator 120 may then proceed to resolve the block conflicts. For each block conflict the interval coordinator may determine whether there is a suspended in-progress write for the block in conflict, as illustrated by block 940. If there is an in-progress write for a conflict block, interval coordinator 120 may request that the node holding the in-progress write complete the in-progress write, thus allowing replication target 140 to overwrite any earlier writes for the block.

If there is not an in-progress write for a conflict block, interval coordinator 120 may request that a node read the data for the conflict block from primary storage 130 and forward that data to replication target 140, as illustrated by block 950. As noted above, interval coordinator 120 may also include with a final block conflict list message conflict-resolving instructions, such as for a node to read data for certain blocks and forward them to replication target 140. As discussed above, a node may include an indication that the data in a conflict-resolving write for a block should overwrite any earlier data for that block (within the current interval). Additionally, interval coordinator 120 may also send instructions for a node to complete an in-progress write for a conflict block. Thus, in some embodiments, replication target 120 may receive conflict-resolving writes for conflict blocks for the currently ending interval.

While there are still block conflicts to be resolved, interval coordinator 120 may move on and determine how to resolve the next block conflict, as illustrated by blocks 970 and 930. As interval coordinator 120 and the nodes finish resolving block conflicts for each node, interval coordinator 120 may, in some embodiments, send a message including the new consistency interval ID to the node, and in response the node may send a consistency point message to replication target 140. After all block conflicts have been resolved, as described above, replication target 140 may generate a consistency checkpoint or snapshot of the data for the consistency interval, as illustrated by block 980. However, as noted above, replication target 140 may only generate a consistency checkpoint or snapshot for the interval after receiving a consistency point from all the nodes, in some embodiments.

Figure 10:
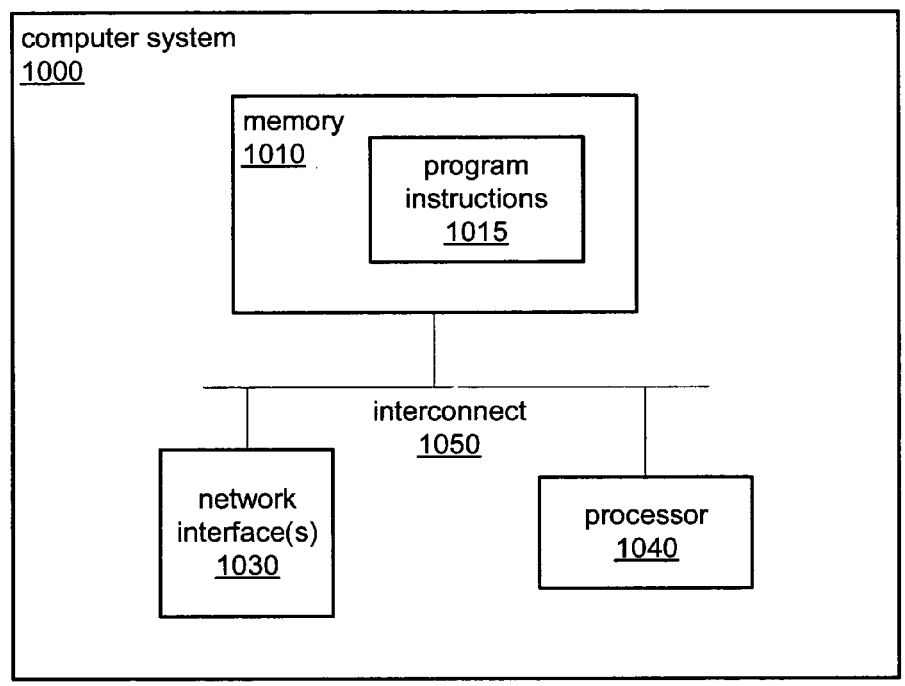
FIG. 10 is a block diagram illustrating a computer system capable of implementing consistency interval marker based replication and/or block conflict resolution in a networked environment, according to one embodiment.

FIG. 10 illustrates a computing system capable of implementing consistency interval marker based replication and block conflict resolution as described herein and according to various embodiments. Computer system 1000 may be any of various types of devices, including, but not limited to, a personal computer system, desktop computer, laptop or notebook computer, mainframe computer system, handheld computer, workstation, network computer, a consumer device such as a mobile phone, pager, or any type of networkable peripheral device such as storage devices, switches, modems, routers, etc, or in general any type of networkable computing device. Computer system 1000 may include at least one processor 1040. Processor 1040 may couple across interconnect 1050 to memory 1010 and I/O interfaces 1030. I/O interfaces 1030 may be any of various types of interfaces configured to couple with and communicate with other devices, according to various embodiments. In one embodiment I/O interfaces 1030 may represent a network interface configured to couple with and communicate over network 100 illustrated in FIG. 1, described above.

Memory 1010 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1010 may include program instructions 1015 configured to implement consistency interval marker based replication in a clustered and/or distributed environment, as described above. In certain embodiments, program instructions 1015 may be configured to implement an interval coordinator, such as interval coordinator 120, or a shared-write coordinator, such as shared-write coordinator 150, both described above. In other embodiments, program instructions 1015 may be configured to implement a replication target, such as replication target 140, also described above. In yet other embodiments, program instructions 1015 may be configured to implement a source node, such as nodes 110, 112, and 114, also described above.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
one or more nodes in a distributed computing environment sending replicated write requests to a replication target device, wherein an indication of a first consistency interval is associated with each replicated write request;
initiating a consistency interval transition that defines a point in time for which data on the replication target device is in a consistent state;
in response to the initiation of the consistency interval transition, each of the one or more nodes:
temporarily suspending sending replicated write requests to the replication target device; and subsequent to said temporarily suspending:
sending a consistency interval marker to the replication target device; and
resuming sending replicated write requests to the replication target device, wherein an indication of a second consistency interval is associated with each replicated write request sent after said resuming.

2. The method of claim 1, wherein each of the replicated write requests further includes a node-specific sequence number, wherein the node-specific sequence number is incremented with each replicated write request from a single one of the nodes.

3. The method of claim 1, wherein initiating an interval transition comprises a consistency interval coordinator sending an interval end message to each of the nodes including an indication that the first consistency interval has ended.

4. The method of claim 3, further comprising each of the nodes sending an interval completion acknowledgement message to the consistency interval coordinator in response to receiving the interval end message.

5. The method of claim 4, further comprising the consistency interval coordinator resolving an ordering ambiguity between two or more write requests from different nodes during the first consistency interval.

6. The method of claim 4, further comprising the consistency interval coordinator sending an interval start message to each of the nodes in response to receiving an interval completion acknowledgement message from every one of the one or more nodes.

7. The method of claim 6, wherein the interval start message includes the indication of the second consistency interval.

8. The method of claim 3, wherein the consistency interval coordinator resides on the replication target device.

9. The method of claim 3, further comprising the replication target device sending the consistency interval coordinator a message indicating that the replication target device has received the consistency interval marker from every one of the one or more nodes.

10. The method of claim 1, further comprising the replication target device storing a checkpoint of data associated with the replicated write requests received from the one or more nodes in response to receiving the consistency interval marker from every one of the one or more nodes.

11. The method of claim 1, further comprising maintaining consistency recovery information for data associated by the replicated write requests.

12. A system, comprising:
one or more source nodes in a networked computing environment;
a consistency interval coordinator coupled to the one or more source nodes;
a replication target device coupled to the one or more source nodes and the consistency interval coordinator;
wherein each of the one or more source nodes is configured to send replicated write requests to the replication target device, wherein an indication of a first consistency interval is associated with each of the replicated write requests;
wherein the consistency interval coordinator is configured to send an interval end message to each of the one or more source nodes indicating that the first consistency interval has ended;
wherein in response to receiving the interval end message, each of the one or more source nodes is further configured to:
temporarily suspend sending replicated write requests to the replication target device;
send a consistency interval marker to the replication target device; and
resume sending replicated write requests to the replication target device, wherein an indication of a second consistency interval is associated with each replicated write request sent after said resuming;
wherein each of the one or more source nodes, the consistency interval coordinator, and the replication target device are implemented on a hardware device.

13. The system of claim 12, wherein each of the replicated write requests further includes a node-specific sequence number, wherein the node-specific sequence number is incremented with each replicated write request from a single one of the source nodes.

14. The system of claim 12, wherein each of the source nodes is further configured to send an interval completion acknowledgement message to the consistency interval coordinator in response to receiving the interval end message.

15. The system of claim 14, wherein the consistency interval coordinator is further configured to resolve an ordering ambiguity between two or more write requests from different nodes during the first consistency interval.

16. The system of claim 14, wherein the consistency interval coordinator is further configured to send an interval start message to each of the nodes in response to receiving an interval completion acknowledgement message from every one of the one or more the source nodes.

17. The system of claim 16, wherein the interval start message includes the indication of the second consistency interval.

18. The system of claim 12, wherein the consistency interval coordinator resides on the replication target device.

19. The system of claim 12, further comprising the replication target device sending the consistency interval coordinator a message indicating that the replication target device has received the consistency interval marker from every one of the one or more source nodes.

20. The system of claim 12, wherein the replication target device is further configured to store a checkpoint of data associated with the replicated write requests received from the one or more source nodes in response to receiving the consistency interval marker from every one of the one or more nodes.

21. A device, comprising:
one or more processors; and
a memory coupled to the one or more processors, wherein the memory comprises program instructions executable by the one or more processors to implement a consistency interval coordinator configured to:
send a consistency interval end message to one or more source nodes in a networked computing environment, wherein each of the one or more source nodes is configured to send replicated write requests to a replication target device, wherein an indication of a first consistency interval is associated with each replicated write request;
receive a message from each of the one or more source nodes acknowledging receipt of the consistency interval end message; and
in response to receiving the message from every one of the one or more source nodes, sending an interval start message comprising an indication of a second consistency interval.

22. A device, comprising:
one or more processors; and
a memory coupled to the one or more processors, wherein the memory comprises program instructions executable by the one or more processors to implement a source node in a network computing environment, wherein the source node is configured to:
send replicated write requests to a replication target device, wherein each replicated write request includes an indication of a first consistency interval;
receive an interval end message from a consistency interval coordinator, wherein the interval end message indicates that the first consistency interval has ended;
in response to receiving the interval end message, the source node is further configured to:
temporarily suspend sending replicated write requests to the replication target device;
send a consistency interval transition message to the replication target device; and
resume sending replicated write requests to the replication target device, wherein each replicated write request sent after said resuming includes an indication of a second consistency interval.

23. A device, comprising:
one or more processors; and
a memory coupled to the one or more processors, wherein the memory comprises program instructions executable by the one or more processors to implement a replication target device in a networked computing environment, wherein the replication target device is configured to:
receive replicated write requests from one or more source nodes in the networked computing environment, wherein an indication of a first consistency interval is associated with each replicated write request;

receive a consistency interval marker from each of the one or more source nodes; and in response to receiving the consistency interval marker from every one of the source nodes, store a checkpoint of data associated with the replicated write requests received from the one or more source nodes.

24. A computer accessible medium, comprising program instructions computer-executable to implement:

a node in a distributed computing environment sending replicated write requests to a replication target device, wherein an indication of a first consistency interval is associated with each replicated write request;

in response to an initiation of a consistency interval transition, the node:

temporarily suspending sending replicated write requests to the replication target device; and subsequent to said temporarily suspending:

sending a consistency interval marker to the replication target device; and resuming sending replicated write requests to the replication target device, wherein an indication of a second consistency interval is associated with each replicated write request sent after said resuming.

* * * * *